(12) United States Patent
Liu et al.

(10) Patent No.: US 12,389,464 B2
(45) Date of Patent: Aug. 12, 2025

(54) PHYSICAL CHANNEL CONFIGURATION ALIGNMENT BETWEEN RADIO UNIT AND DISTRIBUTED UNIT IN OPEN-RADIO ACCESS NETWORK

(71) Applicant: Dell Products L.P., Round Rock, TX (US)

(72) Inventors: Jia Liu, Newmarket (CA); Weihong Zhang, Ottawa (CA); Wenhong Zhang, Ottawa (CA)

(73) Assignee: DELL PRODUCTS, L.P., Round Rock, TX (US)

( * ) Notice: Subject to any disclaimer, the term of this patent is extended or adjusted under 35 U.S.C. 154(b) by 427 days.

(21) Appl. No.: 17/935,319

(22) Filed: Sep. 26, 2022

(65) Prior Publication Data

US 2024/0107592 A1 Mar. 28, 2024

(51) Int. Cl.
*H04W 74/08* (2024.01)
*H04W 24/08* (2009.01)
*H04W 74/00* (2009.01)
*H04W 74/0833* (2024.01)

(52) U.S. Cl.
CPC ....... *H04W 74/0891* (2013.01); *H04W 24/08* (2013.01); *H04W 74/004* (2013.01); *H04W 74/0833* (2013.01)

(58) Field of Classification Search
CPC ............. H04W 74/0891; H04W 24/08; H04W 74/004; H04W 74/0833; H04W 74/006
See application file for complete search history.

(56) References Cited

U.S. PATENT DOCUMENTS

| | | | |
|---|---|---|---|
| 2017/0064742 A1* | 3/2017 | Ramos | H04W 74/0833 |
| 2022/0141876 A1* | 5/2022 | Gorain | H04L 27/2636 |
| | | | 370/329 |
| 2022/0150983 A1* | 5/2022 | Wei | H04W 74/0841 |
| 2022/0159741 A1* | 5/2022 | Hoang | H04W 74/08 |

(Continued)

FOREIGN PATENT DOCUMENTS

| | | |
|---|---|---|
| EP | 3 108 712 A1 | 12/2016 |
| WO | 2015/126288 A1 | 8/2015 |

OTHER PUBLICATIONS

Technical Specification "O-RAN Alliance Working Group 4 Management Plane Specification" O-RAN.WG4.MP.0-v08.00, O-RAN Alliance 2022. (225 pages).

(Continued)

*Primary Examiner* — Habte Mered
(74) *Attorney, Agent, or Firm* — Amin, Turocy & Watson, LLP

(57) ABSTRACT

The described technology is generally directed towards interoperability between distributed units (DUs) and radio units (RUs) in a radio access network (RAN) network. Various embodiments are presented to enable automated determination and/or automated implementation of various configurations and functionalities on a physical random access channel (PRACH) between a DU and a RU. The automated operations presented herein enable a DU to discover and verify PRACH functionality (e.g., regarding PRACH time offset) supported by a RU and/or implementation of the PRACH functionality at the RU to enable interoperability between the DU and the RU, thereby satisfying the interoperability requirement of the O-RAN specification.

20 Claims, 13 Drawing Sheets

(56) References Cited

U.S. PATENT DOCUMENTS

| | | | | |
|---|---|---|---|---|
| 2022/0418043 A1* | 12/2022 | Karkkainen | ........ | H04L 25/0226 |
| 2023/0128512 A1* | 4/2023 | Kumar | .............. | H04W 74/0836 |
| 2023/0209549 A1* | 6/2023 | Amuru | .................. | H04L 5/0094 |
| | | | | 370/329 |
| 2023/0336295 A1* | 10/2023 | Sung | ..................... | H04L 5/0048 |
| 2024/0196445 A1* | 6/2024 | Ahmed | ............. | H04W 74/0833 |

OTHER PUBLICATIONS

Technical Specification "O-RAN Working Group 4 (Open Fronthaul Interfaces WG) Control, User and Synchronization Plane Specification" O-RAN-WG4.CUS.0-v08.00, O-RAN Alliance 2022. (335 pages).

Technical Specification 5G; NR; Physical channels and modulation 3GPP 5G a Global Initiative (3GPP TS 38.211 version 15.3.0 Release 15) ETSI TS 138 211 V15.3.0 (Oct. 2018) (98 pages).

International Search Report and Written Opinion received for PCT Application Serial No. PCT/US2023/033304 dated Nov. 30, 2023, 14 pages.

Communication pursuant to Rules 161(1) and 162 EPC received for European Patent Application Serial No. EP23793115.9 dated May 8, 2025, 3 pages.

International Preliminary Report on Patentability received for PCT Application Serial No. PCT/US2023/033304 dated Apr. 10, 2025, 8 pages.

\* cited by examiner

*Example – n_SFN, Subframe number, Starting symbol number are defined in 3GPP 38.211 per each PRACH config index*

< 38.211 v15.3.0-Table 6.3.3.2-3: Random access configurations for FR1 and unpaired spectrum >

| PRACH Configuration Index | Preamble format | $n_{SFN} \bmod x = y$ | | Subframe number | Starting symbol | Number of PRACH slots within a subframe | $N_t^{RA,slot}$, number of time-domain PRACH occasions within a PRACH slot | $N_{dur}^{RA}$, PRACH duration |
|---|---|---|---|---|---|---|---|---|
| | | x | y | | | | | |
| 151 | B4 | 2 | 1 | 4,9 | | | 1 | 12 |
| 152 | B4 | 2 | 1 | 4,9 | 0 | 2 | 1 | 12 |
| 153 | B4 | 2 | 1 | 8,9 | 0 | 2 | 1 | 12 |
| 154 | B4 | 2 | 1 | 2,3,4,7,8,9 | 0 | 1 | 1 | 12 |
| 155 | B4 | 1 | 0 | | | | 1 | 12 |

Configuration 154 Selected

FIG. 4

FIG. 7 — AUTO-IoDT PARAMETER EXCHANGE UTILIZING:
OPTION 1: O-RAN C-PLANE PRACH CONFIGURATION, OR
OPTION 2: PRACH CONFIG INDEX BASED CONFIGURATION (3GPP)

PHYSICAL CHANNEL CONFIGURATION ALIGNMENT BETWEEN RADIO UNIT AND DISTRIBUTED UNIT IN OPEN-RADIO ACCESS NETWORK

BACKGROUND

Radio access networks (RANs) provide wide-area wireless connectivity to mobile devices. A RAN can be constructed from devices manufactured by disparate vendors. Given the potentially vast scale and complexity of RANs developed to meet the ever-increasing demand for cellular communications, various vendor consortiums have been formed with a view to generating specifications to facilitate configurations, techniques, methods, equipment, etc., for respective communications on a RAN. Such consortiums include the Third Generation Partnership Project (3GPP), Long-Term Evolution Fourth Generation (LTE 4G), Fifth Generation/New Radio (5G, 5G/NR), and most recently, the Open-Radio Access Network (O-RAN).

The RAN architecture can include central units (CUs), distributed units (DUs), and radio units (RUs). Generally, CUs centralize RAN packet processing functions, DUs conduct baseband processing functions across cell sites, and RUs provide radio functions at antenna sites. While the RUs are located at antenna sites, the locations of CUs and DUs are not fixed to any particular geographic area or site. DUs can be co-located with RUs local to an antenna, also DUs can be located many miles from RUs, whereby connection between the DUs and RUs is by any suitable technology, e.g., fiber optics. CUs and DUs can be located "in the cloud", such as at a data center which may or may not be proximal to the RU.

An impetus of O-RAN is for an open, disaggregated RAN, which can be achieved by splitting the RAN architecture and protocols into different, independent components. Disaggregation is anticipated to reduce energy consumption, improve system performance, and allow for rapid, open innovation in different components while ensuring a multi-vendor operability network.

The above-described background is merely intended to provide a contextual overview of some current issues and is not intended to be exhaustive. Other contextual information may become further apparent upon review of the following detailed description.

SUMMARY

The following presents a simplified summary of the disclosed subject matter to provide a basic understanding of one or more of the various embodiments described herein. This summary is not an extensive overview of the various embodiments. It is intended neither to identify key or critical elements of the various embodiments nor to delineate the scope of the various embodiments. The sole purpose of the Summary is to present some concepts of the disclosure in a streamlined form as a prelude to the more detailed description that is presented later.

In one or more embodiments described herein, systems, devices, computer-implemented methods, configurations, apparatus, and/or computer program products are presented to facilitate interoperability across a RAN architecture/topology between DUs, RUs, and user equipment (UEs).

According to one or more embodiments, a computer-implemented method is provided, wherein the method comprises facilitating, by a first device comprising a processor, receiving a first signal comprising indication data representative of an indication of physical random access channel (PRACH) configurations available for implementation by a second device communicatively coupled to the first device via a radio access network (RAN). The method can further comprise based on the indication, selecting, by the first device, a PRACH configuration of the PRACH configurations to be utilized at the second device for an operation using a PRACH. The method can further comprise facilitating, by the first device, transmitting, to the second device, a second signal comprising instruction data representative of an instruction to the second device to implement the PRACH configuration. In an embodiment, the PRACH configurations can relate to a PRACH time offset, e.g., utilized by a third device communicatively coupled to the second device. In an embodiment, the first device is a distributed unit that is part of the RAN, second device is a radio unit that is part of the RAN.

Further embodiments can utilize a system, comprising at least one processor, and a memory coupled to the at least one processor and having instructions stored thereon, wherein, when executed by the at least one processor, the instructions facilitate performance of operations, comprising receiving first data from a first device, wherein the first data pertains to a first PRACH configuration of a group of PRACH configurations available to be implemented on the first device. In an embodiment, the operations can further comprise comparing the first data with second data, wherein the second data is stored locally and relates to the first PRACH configuration. In a further embodiment, the operations can further comprise, in response to determining that the first data matches the second data, instructing the first device to implement the first PRACH configuration. In an embodiment, the first PRACH configuration comprises an offset parameter representative of a PRACH timing offset value utilized by a second device communicatively coupled to the first device. In another embodiment, the first device is a RU located on a RAN and the system is a DU located on the RAN. In a further embodiment, the first data was generated during a previous implementation of the first PRACH configuration on the first device, and the second data was generated during a previous implementation of the first PRACH configuration on the system. In a further embodiment, the first data comprises a parameter setting for the first PRACH configuration obtained from configuration data stored at the first device for the first PRACH configuration and the second data comprises the parameter setting for the first PRACH configuration stored at the system. In a further embodiment, the first PRACH configuration is a control-plane PRACH configuration. In another embodiment, the first PRACH configuration is an index-based PRACH configuration. In a further embodiment, the operations can further include in response to determining that the first data and the second data do not match, instructing the first device to send third data, wherein the third data is for a second PRACH configuration of the group of PRACH configurations stored at the first device, comparing the third data with fourth data, wherein the fourth data is stored locally and relates to the second PRACH configuration, and in response to determining that the third data and the fourth data match, instructing the first device to implement the second PRACH configuration.

Further embodiments can include a computer program product stored on a non-transitory computer-readable medium and comprising machine-executable instructions, wherein when executed, the machine-executable instructions cause a machine to perform operations, comprising receiving first data from a first device communicatively coupled to the machine operating on a second device via a RAN, wherein the first data describes a first configuration in a set of configurations available at the first device to facilitate communications between the first device, the second device, and a third device communicatively coupled to the first device. In another embodiment, the operations can further include comparing the first data with second data stored at the second device, wherein the second data describes implementation of a version of the first configuration at the second device. In another embodiment, the operations can further include, responsive to the first data and the second data being determined to match, instructing the first device to implement the first configuration. In an embodiment, the set of configurations is a set of PRACH configurations. In a further embodiment, each configuration in the set of PRACH configurations is a control-plane PRACH configuration or an index-based PRACH configuration. In a further embodiment, the set of configurations describes a PRACH timing offset utilized for the communication between the third device, the first device, and the second device. In an embodiment, the first device is a radio unit of the RAN and the second device is a distributed unit of the RAN. In another embodiment, the operations can further include, responsive to the first data and the second data being determined not to match, instructing the first device to send third data, wherein the third data describes a second configuration in the set of configurations available at the first device to facilitate communications between the first device, the second device, and the third device. In another embodiment, the operations can further include comparing the third data with fourth data stored at the second device, wherein the fourth data describes implementation of a version of the second configuration at the second device. In a further embodiment, the operations can further include, responsive to the third data and the fourth data being determined to match, instructing the first device to implement the second configuration.

The following summarizes various advantages and benefits of utilizing one or more embodiments presented herein over current technologies and methodologies. Further, the various embodiments presented herein involve resources and engineering to build, rendering the embodiments non-obvious Current O-RAN specifications only implement a single PRACH configuration (e.g., for PRACH time offset) for communications between a DU and a RU. The various embodiments presented herein facilitate selection and implementation of a PRACH configuration selected from a set of available PRACH configurations, where the available PRACH configurations include, at least, an O-RAN defined configuration, a 3GPP defined PRACH index-based configuration, and other methodologies.

To improve configuration compatibility, various embodiments presented herein can implement an automatic-interoperability device test (Auto-IoDT) between a DU and a RU. Implementing the Auto-IoDT enables verification of PRACH configurations supported by current O-RAN specifications, but also other channel configurations such as 3GPP physical channel configurations, and other available configurations. In an embodiment, the Auto-IoDT can also eliminate the need for extra test equipment and testing, as currently required for manual set up of an existing IoDT.

In a further embodiment, an automatic coordinating process between the DU and the RU can be incorporated into a start-up sequence. During initialization of a DU and a RU, the DU can retrieve the RU capabilities (e.g., regarding supported PRACH configurations) and then select a configuration that facilitates communication (e.g., of a PRACH time offset) between a DU and a RU, thereby ensuring compatibility between a DU and a RU. In one or more embodiments, the automatic coordinating process can minimize/prevent configuration mismatch failures between a DU and a RU that limit interoperability between devices being utilized on a RAN in accordance with current O-RAN specifications.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 4 presents Table 6.3.3.2-3: Random access configurations for FR1 and unpaired spectrum, from the 3GPP 38.211 specification, illustrating elements which can be incorporated into one or more embodiments described herein.

DETAILED DESCRIPTION

Figure 1:
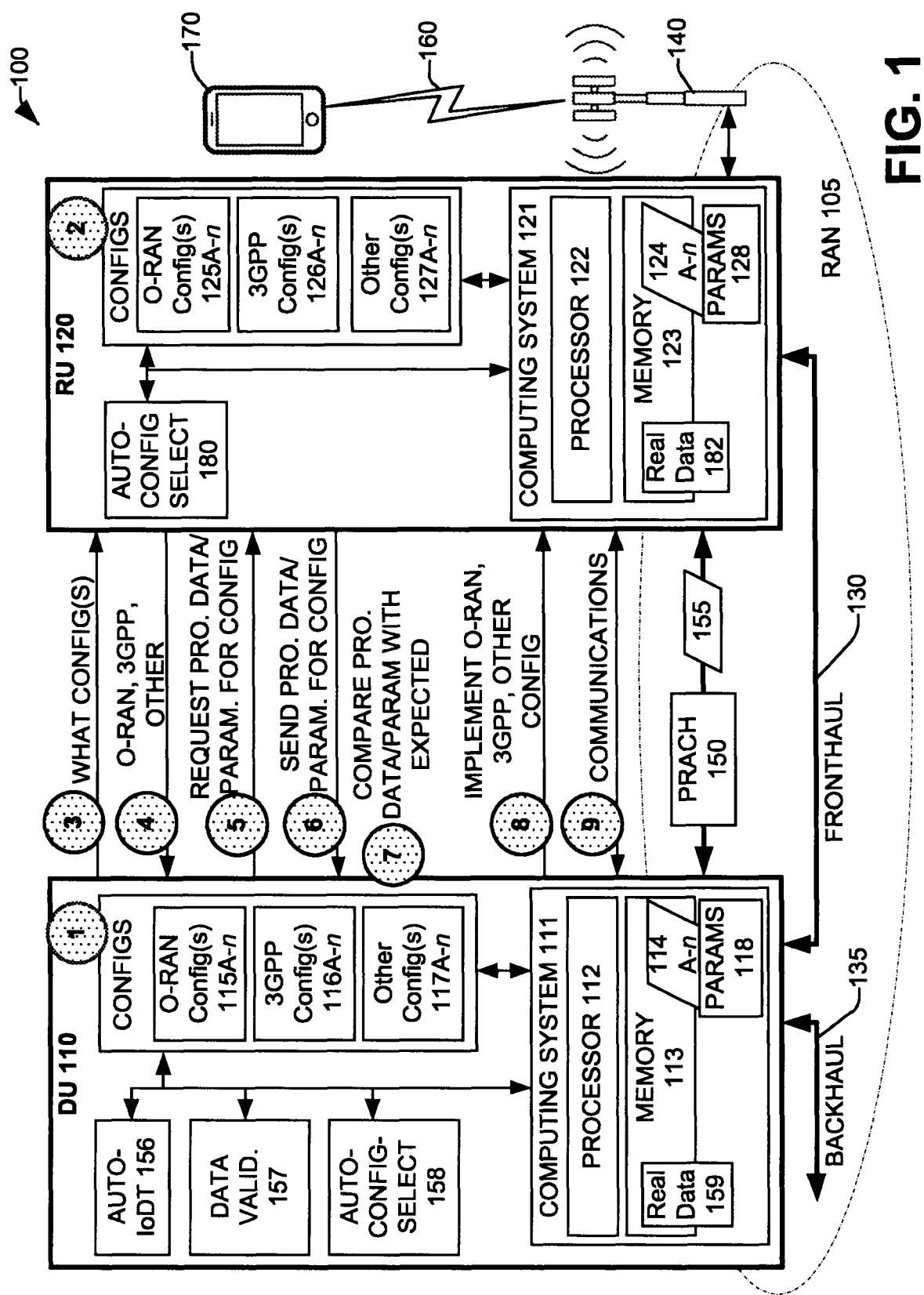
FIG. 1 is a diagram illustrating components in a RAN and respective operations relating to configuring interoperability between a DU and a RU, in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is to be appreciated, however, that the various embodiments can be practiced without these specific details, e.g., without applying to any particular networked environment or standard. In other instances, well-known structures and devices are shown in block diagram form in order to facilitate describing the embodiments in additional detail.

1. SYNOPSIS

The subject application generally relates to configuration of radio access network components in a cellular network. The various embodiments presented herein are directed towards increasing interoperability between one or more DUs and RUs located in a RAN. The various embodiments can be adopted into O-RAN Alliance specifications to improve the plug and play capabilities of DUs and RUs, while providing cost efficiencies and reduction in operational complexity, without requiring manual IoDT activity and/or technology selection.

The O-RAN alliance has published specifications for multi-vendor DUs and RUs to interact as part of the construction and operation of a RAN. One method for communication between UE and the RAN can utilize a PRACH, wherein a respective UE can utilize the PRACH to request an uplink to a base station or other component(s) located in the RAN. In an embodiment, the PRACH operations between a UE and a RU can occur on the 3GPP physical channel. The PRACH operations can include utilizing a PRACH time offset, e.g., a starting time of PRACH repetition operation after a PRACH cyclic prefix (CP).

A set of configurations are currently available to establish and/or utilize the PRACH time offset function between the DU and RU. However, current O-RAN specification(s) define utilizing a specific configuration, the O-RAN fronthaul control-plane (FH C-Plane) configuration. Accordingly, utilization of PRACH time offset in accordance with the limited scope of implementation presented in the O-RAN specification(s) can create interoperation issues between respective DUs and RUs. Interoperation issues can arise due to, for example, (a) various configurations may be respectively supported by the DU and the RU, but the respective implementation of the configurations at the DU and RU do not match/align, (b) DU and/or RU vendors implement the configurations incorrectly due to misinterpretation of the O-RAN specification(s) and/or 3GPP specification(s), (c) a DU vendor or a RU vendor may choose to implement a vendor specific method for communicating the PRACH time offset but the vendor specific method is not outlined in the O-RAN specification(s), etc. Accordingly, to achieve the desired interoperability with the current O-RAN specification(s), one or both of the DU and/or the RU will have to undergo a software re-development and software update to enable the interoperation, the software re-development and software update can be time and resource demanding.

Per the various embodiments presented herein, methods and approaches are presented such that if one of the available PRACH time offset configurations does not work for a particular DU/RU combination, another configuration can be analyzed and implemented. This mix-and-match approach to configuration implementation can increase the likelihood of interoperation success compared with the current specifications.

Furthermore, current O-RAN specifications do not describe automatic review of a first configuration, a second configuration, an nth configuration, etc., in a set of available configurations. Furthermore, the specifications do not describe an automated process to select, from the set of configurations, a particular configuration to be utilized by the DU/RU pairing.

With the various embodiments presented herein, the DU and RU can implement and support an automated configuration selection (aka, "Auto-config-select", "Auto-config-selection") which can be configured to automatically determine/select a configuration from a set of available configurations. Further, automated selection and implementation of a configuration avoids having to expend manual effort and time selecting a configuration, thereby increasing the operational efficiency of the various systems presented herein. The automated processes presented in the various embodiments herein, can facilitate a plug and play interaction between a DU and a RU, thereby satisfying a key requirement for an operator to adopt O-RAN.

Further regarding current systems, existing DU and RU implementations do not support any automatic interoperability device testing (Auto-IoDT) functionality to verify if a configuration implemented at a DU can work/is aligned with the RU (e.g., PRACH time offset or other 3GPP Physical Channel configurations between a DU and a RU). Currently, verification of interoperability between DU and RU equipment may require specific installation/initialization, which can require utilizing additional testing equipment and labor, e.g., a manual IoDT process. A specific installation set up can create additional overhead in terms of time and efforts to enable interoperation and integration of products from a group of disparate vendors. If, at any time, the DU is updated/new configuration implemented thereon, or the respective software operating on a DU and/or a RU changes, a manual IoDT has to be re-performed which again increases operational overhead of the RAN.

The various embodiments presented herein enable a DU and a RU to respectively support Auto-IoDT functions to verify if a configuration can function between a DU and a RU. As described further herein, two automatic IoDT processes are presented herein, a) Auto-IoDT parameter exchange and b) Auto-IoDT real data. With application of either of the Auto-IoDT processes, during a start up process, a DU and a RU pairing can verify that they respectively support the same PRACH time offset configuration. Compared with current systems, no extra set up is required for the IoDT functionality presented herein. Further, the automated IoDT self-checking capability can save time and efforts for operators over current approaches.

The Auto-IoDT features can also be used in other scenarios besides the start-up process, e.g., when change to the configuration occurs, a software/firmware update occurs, etc. Under such scenarios, the Auto-IoDT can reduce operational efforts.

2. TERMINOLOGY

It is to be appreciated that multiple terms may be utilized herein to describe a particular device. For example, a RU can also be referred to as an Open-Radio Unit (O-RU), with the respective terms being used interchangeably herein. Also, a DU can also be referred to as an Open-Distributed Unit (O-DU), with the respective terms being used interchangeably herein.

The interface in a RAN between a DU and a RU is commonly referred to as the fronthaul (FH). The FH can be configured to enable interconnection between a DU and a RU manufactured/supplied by different vendors.

Different "planes" of operation facilitate data transfer, communication, and messaging between a DU and a RU:

a "control plane" (C-plane) can be configured to control and define issues pertaining to scheduling, coordination required for data transfer, beam-forming, etc., including a) scheduling and beam-forming commands, b) downlink (DL) precoding configuration, c) mixed numerology and PRACH handling, etc.

a "user plane" (U-plane) can be configured to facilitate efficient data transfer in accordance with the various limitations of radio numerologies (e.g., 5G, 3GPP), e.g., messaging time limits. Communications via the U-plane can include a) supporting data compression, b) in-phase and quadrature (I/Q) data transfer, c) DL data precoding, etc.

a "management plane" (M-plane) can be configured to manage the RU. The M-Plane can provide a variety of RU management functions to define parameters on the RU side as required by the C-Plane and the U-Plane. For example, M-plane messaging can be utilized to manage RU software, perform fault management, etc. O-RAN fronthaul specification for the M-Plane provides various parameters as data models to FCAPS functions. In an embodiment, the M-plane can eliminate dependence on implementations by respective RU vendors, thereby enabling construction of a multi-vendor O-RAN. Accordingly, the M-plane can be utilized to a) support Hierarchical/Hybrid Model, b) C/U Plane IP and Delay management, c) FCAPS including sync configuration and status, etc.

The Service Management and Orchestration (SMO) platform is an intelligent automation platform for O-RAN radio resources. The specifications for SMO framework are defined by the O-RAN Alliance. The SMO is a component of the Operation Support Systems (OSS).

FCAPS relates to management systems: (i) F—Fault Management, e.g., concerning determination and reporting of faults in a network; (ii) C—Configuration Management, e.g., concerning loading/changing configuration on network elements and configuring services in network; (iii) A-Account Management, e.g., compiling usage statistics for billing; (iv) P-Performance Management, e.g., concerns reading performance related statistics, for example reading utilization, error rates, packet loss, and latency; and (v) S-Security Management, e.g., concerning controlling access to assets of network, including authentication, encryption and password management.

The Common Public Radio Interface (CPRI) is an interface that transmits data between remote radio units to base station units. Enhanced CPRI (eCPRI) is a methodology utilized to split up baseband functions to reduce traffic strain across the interface (e.g., across the interface fiber).

n is any positive integer.

3. OVERVIEW

Turning to the figures, FIG. 1 presents a system 100 comprising various components located in a RAN 105 and respective operations relating to interoperability between the components, in accordance with one or more embodiments described herein. To aid understanding, FIG. 1 presents various embodiments in a series of steps (1)-(9).

As shown, a RAN 105 can include a DU 110 communicatively coupled to a RU 120, wherein the DU 110 and RU 120 can be connected via a fronthaul 130. The DU 110 can be communicatively coupled with other components, e.g., via a backhaul 135. The RU 120 can be communicatively coupled to a cellular tower/antenna 140, or other suitable system, to facilitate transmission of communications 160 (e.g., cellular communications) between the RU 120 and UE 170. The communications can comprise digital messages, digital data, digital symbols, and the like. UE 170 can be any of a user equipment, a wearable communication device, an extended reality device, an Internet of Things device, an automated assistant device, and the like. As illustrated, the DU 110 can include computing system 111 comprising a processor 112 and a memory 113 (e.g., to store configurations/functions/code/modules/instructions/programs that can be executed/analyzed by the processor 112).

In an embodiment, communications 160 between any of the DU 110, RU 120, and UE 170, can be conveyed by utilizing a PRACH 150. To facilitate conveyance of the communications between the UE 170 and RU 120, and further, between the DU 110 and the RU 120, a PRACH time offset configuration 155 can be utilized (wherein configuration 155 can be any of configurations 115A-n, 116A-n, and 117A-n, 125A-n, 126A-n, and/or 127A-n, as further described herein).

As previously mentioned, various methods and procedures can be utilized for the PRACH time offset configuration. For example, O-RAN specifications disclose a "C-plane PRACH time offset" configuration. In another example, 3GPP specifications disclose a "configuration index-based PRACH time offset" configuration. It is to be appreciated that the various embodiments presented herein are not limited to the O-RAN specified C-plane PRACH time offset configuration or the 3GPP specified configuration index-based PRACH time offset configuration, rather, the various embodiments presented herein can apply to any other Physical Channel Configurations.

Hence, as shown in FIG. 1, step (1), the DU 110 can be configured to include the respective functionality available for implementation thereon. Accordingly, DU 110 can be configured with an O-RAN configuration(s) 115A-n (e.g., O-RAN C-plane PRACH time offset configuration), a 3GPP configuration(s) 116A-n (e.g., 3GPP configuration index-based PRACH time offset configuration), and other configuration(s) 117A-n, wherein other configuration(s) 117A-n can be any other Physical Channel configuration as previously described. In an embodiment, the configurations 115A-n, 116A-n, and 117A-n can be stored in memory 113 to be executed by computing system 111, e.g., by processor 112. Memory 113 can include a set of look-up tables (LUTs) 114A-n configured to store parameters 118 defined for one or more configurations 115A-n, 116A-n, and 117A-n, wherein the parameters 118 can be reviewed in an Auto-IoDT configuration parameter exchange process (as further described herein).

Further, memory 113 can store configuration real process data 159 generated during implementation of the one or more configurations 115A-n, 116A-n, and 117A-n for review in an Auto-IoDT configuration real data exchange process (as further described herein).

As illustrated, the RU 120 can include a computing system 121 comprising a processor 122 and a memory 123 (e.g., to store functions/code/modules/instructions/programs that can be executed/analyzed by the processor 122). As further shown in FIG. 1, step (2), the RU 120 can be configured to include the respective functionality available for implementation thereon. RU 120 can be configured with one or more of an O-RAN configuration(s) 125A-n (e.g., O-RAN C-plane PRACH time offset), a 3GPP configuration(s) 126A-n (e.g., 3GPP Configuration index-based PRACH time offset), and other configuration(s)

127A-n, wherein other configuration(s) 127A-n can be any other Physical Channel time offset configuration as previously described. In an embodiment, the configurations 125A-n, 126A-n, and 127A-n can be stored in memory 123 to be executed by computing system 121, e.g., by processor 122.

Memory 123 can include a set of LUTs 124A-n configured to store parameters 128 defined for one or more of configurations 125A-n, 126A-n, and 127A-n, wherein the parameters 128 can be stored for review in an Auto-IoDT configuration parameter exchange process (as further described herein). Further, memory 123 can store configuration real process data 182 generated during implementation of the one or more configurations 125A-n, 126A-n, and 127A-n for review in an Auto-IoDT configuration real data exchange process (as further described herein).

Prior to, or during, initial connection of the DU 110 to the RU 120, the DU 110 may not know what PRACH configurations are utilized by the RU 120. Per FIG. 1, step (3), the RU 120 can be interrogated by the DU 110 regarding what PRACH configurations are available at, or utilized by, the RU 120?

At FIG. 1, step (4), the RU 120 responds to the interrogation from DU 110, with a list comprising a set of one or more PRACH configurations being implemented/available at the RU 120. For example, the RU 120 can respond with a signal comprising any combination of configuration(s) 125A-n, 126A-n, and/or 127A-n.

At FIG. 1, step (5), DU 110 can initiate an Auto-IoDT function 156 to determine whether a configuration (e.g., configuration 126A) identified as being available at the RU 120 can interact with the same, or substantially the same, configuration available at the DU 110 (e.g., configuration 116A). In an embodiment, the Auto-IoDT functionality 156 can be located at the DU 110, e.g., the Auto-IoDT function 156 code can be stored in memory 113 with execution of the code by the processor 112. As further described, in an embodiment, the Auto-IoDT function 156 can request process data 182 from RU 120, to determine if execution of a first configuration on the RU 120 generates first process data 182 comparable to second process data 159 generated by execution of a second configuration on the DU 110, e.g., does process data generated by implementation of the first configuration and second configuration match, or are they dissimilar such that the first configuration and second configuration while being identified as being comparable, will be inoperable together. In another embodiment, the Auto-IoDT function 156 can request parameter data 128 from RU 120, to determine if a first parameter 128 defined as part of a first configuration (e.g., configuration 126B) on the RU 120 is the same, or substantially similar, to a second parameter 118 defined for a second configuration (e.g., configuration 116B), to determine whether the first configuration and the second configuration are the same and operable together, or are they dissimilar such that the first configuration and second configuration, while being identified as being comparable, will be inoperable together. Real process data 159 and 182 is created during implementation of a configuration, while parameter data 118 and 128 is defined during creation of a configuration itself, e.g., parameter data can be a pair of values defined at the time of creation of the configuration.

At FIG. 1, step (6), the RU 120 can review the first configuration identified in the Auto-IoDT request sent by the DU 110, obtain and transmit the requested real data 182 and/or parameter data 128 to the DU 110.

At FIG. 1, step (7), the DU 110 can utilize a data validation component 157 to compare the respective real process data 182 or parameter data 128 received from RU 120 and compare the received data with the process data 159 or parameter data 118 the DU 110 has locally stored for the configuration of interest. If the respective data match, the configurations can be considered to be compatible, if the data does not match, the configurations can be considered to be incompatible. Accordingly, the Auto-IoDT process can be utilized to filter a set of configurations indicated by the RU 120 as being available for implementation, to a subset of configurations that have been identified by the DU 110 as being compatible for implementation by the DU 110 and the RU 120.

At FIG. 1, step (8), based upon at least one of the list of one or more PRACH configurations received from RU 120, or the subset of PRACH configurations identified as being compatible by the Auto-IoDT process 156, the DU 110 can utilize the Auto-config-selection function 158 to select one of the configurations and instruct the RU 120 to implement the configuration at the RU 120. In an embodiment, the Auto-config-selection functionality 158 can be located at the DU 110, e.g., the Auto-config-selection function 158 can be stored in memory 113 with execution of the function by the processor 112. Similarly, to facilitate selection and implementation of a configuration at the RU 120 in response to the Auto-config-selection function 158 at the DU 110, an Auto-config-selection component 180 can be incorporated into RU 120, e.g., the Auto-config-selection component 180 can be stored in memory 123 with execution of the code by the processor 122.

At FIG. 1, step (9), communications between the DU 110 and RU 120 (and the UE 170) can be undertaken using the PRACH configuration as selected by the DU 110 and implemented respectively on the RU 120 and the DU 110.

Per the foregoing, the various embodiments presented herein enable interaction between DUs 110 and RUs 120 having a variety of PRACH configurations (e.g., any of 115A-n and 125A-n, 116A-n and 126A-n, 117A-n and 127A-n) respectively installed thereon. The various embodiments facilitate multiple options for PRACH configuration between components located in a RAN 105. Accordingly, the various embodiments presented herein enable disparate 3r d party vendors to supply respective DU and RU equipment (e.g., DU 110 and RU 120) for incorporation into a RAN (e.g., RAN 105), and the interoperability between the respective DUs and RUs further satisfies the goal of O-RAN regarding RANs constructed with multi-vendor equipment. Furthermore, the incorporation of multi-vendor components can lead to a reduction in construction cost and/or operational cost of a RAN (e.g., RAN 105), which satisfies another goal of the O-RAN Alliance.

As previously mentioned, the O-RAN specification discloses utilization of a C-plane PRACH configuration utilized by a DU and RU (e.g., DU 110 and RU 120) to communicate the PRACH time offset information. The DU can utilize the C-plane startSymbolId, cpLength, and timeOffset fields to communicate to the RU the starting time of the PRACH repetition.

Figure 2:
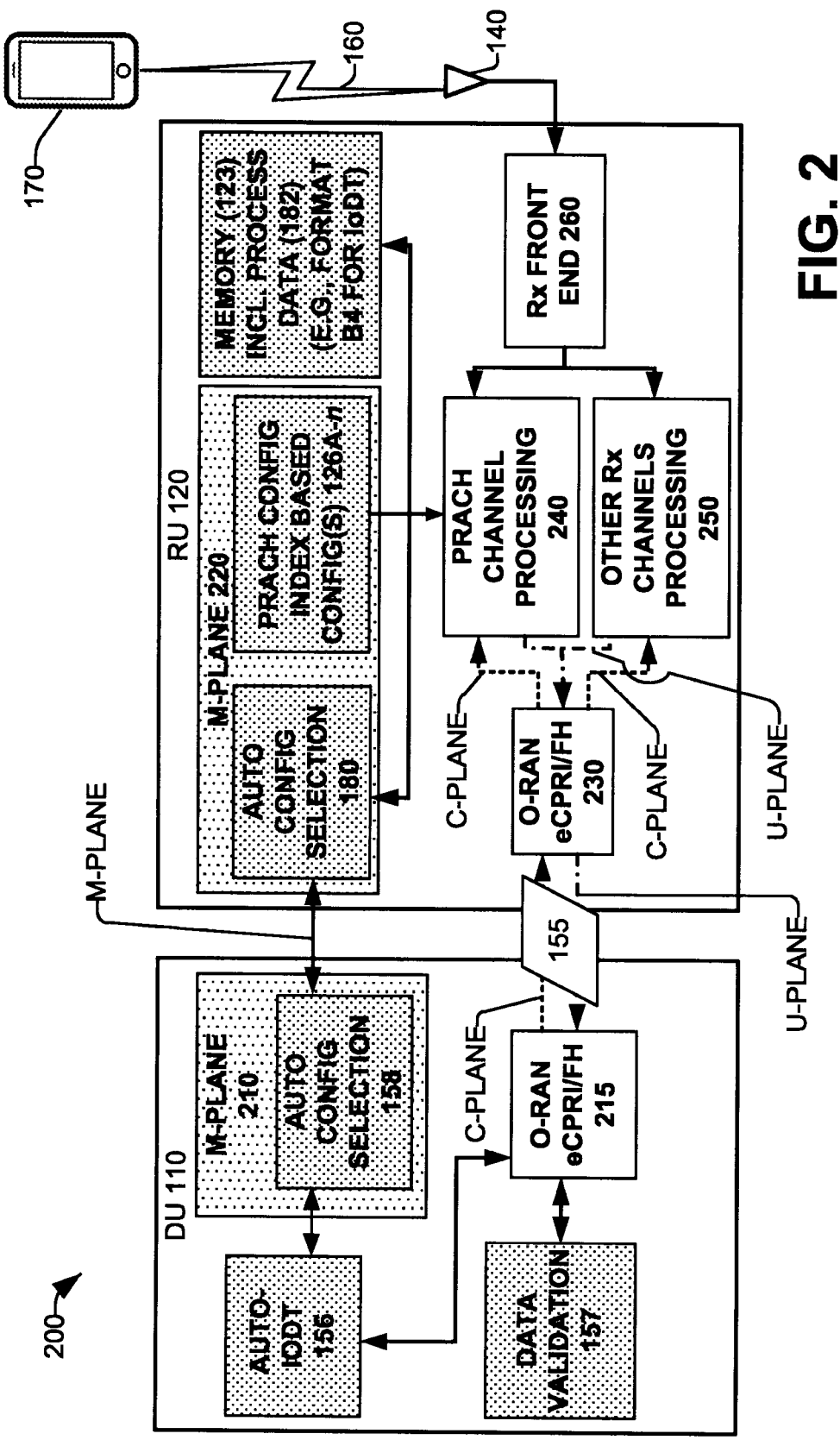
FIG. 2 is a diagram illustrating components in a RAN and respective operations relating to configuring interoperability between a DU and a RU, in accordance with one or more embodiments described herein.

FIG. 2 illustrates an example system 200, in accordance with one or more embodiments described herein comprising various components comprising a RAN 105 and respective operations relating to interoperability between the components. As shown in FIG. 2, a DU 110 is communicatively coupled to a RU 120, wherein communications between the DU 110 and the RU 120 can occur via the M-plane, the C-plane, and/or the U-plane. M-plane 210 is a portion of the M-plane pertaining to the DU 110, and M-plane 220 is a portion of the M-plane pertaining to the RU 120.

Communications received via the antenna 140 can be routed to and from a group of components respectively located in the DU 110 and the RU 120. In an embodiment, an O-RAN eCPRI/FH component 215 located in the DU 110 is communicatively coupled to an O-RAN eCPRI/FH component 230 located in the RU 120 via the U-plane and/or the C-plane, wherein C-plane PRACH config time offset configuration data 155 can be transmitted between the DU 110 and the RU 120. The O-RAN eCPRI/FH component 230 can output data to the PRACH channel processing component 240 (e.g., via the C-plane) and/or to the Other Rx Channels Processing component 250 (e.g., via the C-plane). As further shown in FIG. 2, the PRACH channel processing component 240 and the Other Rx Channels Processing component 250 are communicatively coupled to receive data from the Rx front end component 260, wherein the data can be received from (and transmitted to) the UE 170 via communications 160 between the UE 170 and the antenna 140.

As further shown in FIG. 2, communications between the RU 120 and the DU 110 can be via the U-plane. For example, communications from the Rx front end component 260 received at the PRACH channel processing component 240 and/or the Other Rx channels processing component 250 can be via the U-plane to the O-RAN eCPRI/FH component 230 to the O-RAN eCPRI/FH component 215 via the U-plane.

As further shown in FIG. 2, a base system comprising the DU 110 and the RU 120, and respective components O-RAN eCPRI/FH component 215, O-RAN eCPRI/FH component 230, PRACH channel processing component 240, Other Rx Channels Processing component 250, and Rx front end component 260, can be expanded to facilitate one or more embodiments presented herein. As shown, M-plane functionality can be utilized to facilitate communication between the respective Auto-config-selection components 158 and 180 respectively located in DU 110 and RU 120. The M-plane can also be utilized to facilitate communication between the Auto-IoDT component 156, and any of the Auto-config-selection component 158 (located in the DU 110), the Auto-config-selection component 180, PRACH config index-based config(s) 126A-n, memory 123 and PRACH data 182 stored therein (located in the RU 120). Furthermore, the data validation component 157, located in DU 110, can be in communication with a group of components via the O-RAN eCPRI/FH component 215. As further shown, any of the Auto-config-selection component 180, the PRACH config index-based config(s) 126A-n, and the memory 123 are communicatively coupled to the PRACH channel processing component 240. The additional configurations/components/data/functionality (e.g., Auto-IoDT component 156, data validation component 157, Auto-config-selection component 158, Auto-config-selection component 180, real data 182) and the extended connectivity/communication between the respective components included in DU 110 and RU 120 facilitate implementation of the various embodiments presented herein to increase the interoperability of the DU 110 and RU 120 in a RAN 105.

4. O-RAN PRACH CONFIGURATION

Figure 3:
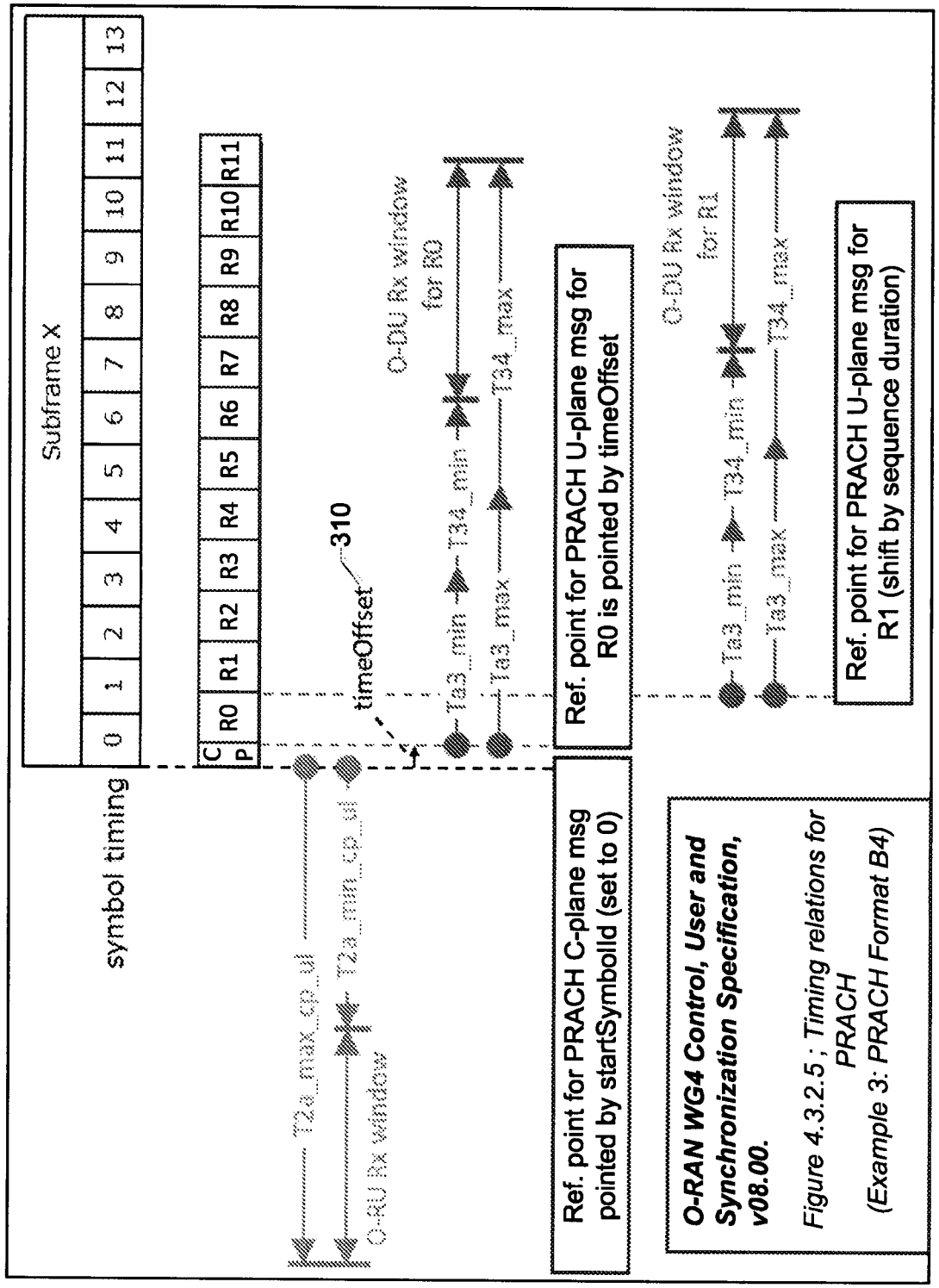
FIG. 3 presents FIG. 4.3.2-5: Timing relations for PRACH (Example 3: PRACH Format B4) extracted from the O-RAN WG4 Control, User and Synchronization Specification, v08.00, illustrating elements which can be incorporated into one or more embodiments described herein.

Turning to FIG. 3, presented is FIG. 4.3.2-5: Timing relations for PRACH (Example 3: PRACH Format B4) extracted from the O-RAN WG4 Control, User and Synchronization Specification, v08.00. The example PRACH Format B4 presented in FIG. 3 depicts respective values for startSymbolId=0, cpLength=0, and timeOffset=484. By knowing this configuration, the RU (e.g., RU 120) knows the time position of PRACH signal from UE and can time stamp the PRACH configuration data 155 sent to DU (e.g., DU 110) through the RAN U-plane accordingly. It is to be noted that utilizing the C-plane PRACH configuration is the default configuration specified in the O-RAN fronthaul CUS-Plane specification. Accordingly, a DU (e.g., DU 110) or RU (e.g., RU 120) utilized in an O-RAN (e.g., RAN 105) should support the C-plane PRACH configuration, and it is likely not necessary for any data fields to be added to support this option. The timeOffset 310 is shown in FIG. 3 as a function of the cyclic prefix (CP). The functionality presented in FIG. 3 can be incorporated into the respective O-RAN configuration 115 in the DU 110 and/or O-RAN configuration 125 of in the RU 120 presented in FIGS. 1 and 2.

5. 3GPP PRACH CONFIGURATION

FIG. 4 presents Table 6.3.3.2-3: Random access configurations for FRI and unpaired spectrum from the 3GPP 38.11 specification (v15.3.0), Example—n-SFN, Subframe number, Starting symbol number are defined in 3GPP 38.211 per each PRACH config index. As also previously mentioned, the 3GPP specification (e.g., 3GPP 38.211) discloses utilizing a PRACH config index-based configuration be utilized to communicate the PRACH time offset between the DU (e.g., DU 110) and the RU (e.g., RU 120). With this definition, the DU 110 sends the RU 120 an assigned PRACH config index-based configuration using the O-RAN fronthaul M-plane (the new data model fields to support this option are presented in Example Codes 1 and 2, herein, below). The RU 120 has stored thereon one or more LUTs 124A-n (e.g., stored in memory 123) based on 3GPP 38.211 specification, any supported frequency band(s), and any supported PRACH configuration indexes. When the DU 110 communicates to the RU 120 the assigned PRACH configuration index, the RU 120 can determine the PRACH preamble format and time position based on comparison with the PRACH configuration index received from the DU 110 and the LUTs 124A-n. For example, for an RU that supports band N78, the LUTs 124A-n can store n_SFN, Subframe number, Starting symbol number, and the cp length for each PRACH configuration index supported by the RU 120. In an example, as depicted in FIG. 4, the DU 110 has selected the "PRACH Configuration Index 154" (from available configuration indexes 0-255) and communicates PRACH config index 154 to the RU 120. Upon receipt of the PRACH config index 154, the RU 120 can identify from index 154 stored in LUTs 124A-n, that the PRACH preamble format is B4, in conjunction with the time position information, including n_SFN, Subframe number, Starting symbol number, and cp length. Accordingly, the RU 120 currently has all the time position information required to send the data/parameters determined from the LUTs 124A-n to the DU 110, e.g., through the O-RAN U-plane. The functionality presented in FIG. 4 can be incorporated into the respective 3GPP configuration 116 in the DU 110 and/or 3GPP configuration 126 in the RU 120 illustrated in FIG. 1.

Figure 5:
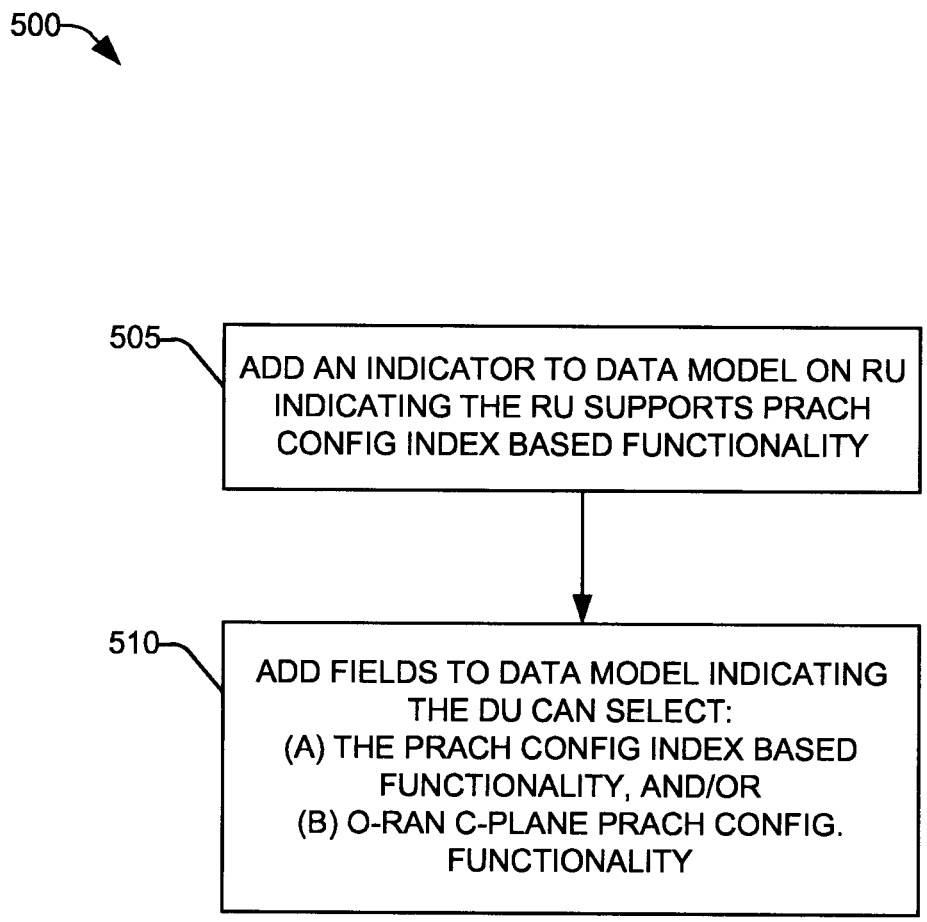
FIG. 5 is a flow diagram of a non-limiting computer implemented method for indicating one or more configurations supported by a RU, in accordance with one or more embodiments described herein.

With reference to FIG. 5, to support the 3GPP PRACH config index-based configuration, new data fields can be added to the RU data model fields (e.g., configuration 126 in the RU 120), as detailed below.

At 505, in an embodiment, an indicator can be added to indicate that the RU 120 supports PRACH config index-based functionality. In an embodiment, computer code/ feature can be added to the RU o-ran-module-cap.yang indicating whether the RU supports PRACH config index-based configuration. Example code for integration into o-ran-module-cap.yang is presented below in Example Code 1.

```
module o-ran-module-cap {
...
    feature PRACH-CONFIG-INDEX-CONFIGURATION-SUPPORTED { description
        "This leaf is used to indicate O-RU's support for PRACH (Physical Random
Access Channel) configuration index based configuration, so that the PRACH time
position information can be found out by O-RU internally based on the PRACH
configuration index and 3GPP 38.211.";
    }
...
}
```

Example Code 1: Module Feature Indicating the Ru Supports PRACH Config Index-Based Functionality In an embodiment, support of the PRACH config index-based configuration can also be added as an optional feature on the FH M-plane.

In a further embodiment, if the RU 120 does not support a PRACH config index-based configuration, this option will not be reported in the PRACH time offset capabilities reported to the DU 110 (e.g., as part of the Auto-IoDT function described further herein).

At 510, in an embodiment, computer code/feature can be added to the O-RAN RU o-ran-uplane-conf.yang indicating whether the RU 120 supports 3GPP PRACH config index-based configuration, and reporting of that support to the DU 110, as presented in Example Code 2.

```
o-ran-uplane-conf
...
+--rw prach-config-indexes* [prach-config-index-id] {mcap:PRACH-CONFIG-
INDEX-CONFIGURATION-SUPPORTED}?
| +--rw prach-config-index-id uint8
| +--rw prach-config-index uint16
...
+--rw low-level-rx-endpoints* [name]
...
| +--rw prach-config-index? -> /user-plane-configuration/prach-config-
indexes/prach-config-index-id {mcap:PRACH-CONFIG-INDEX-CONFIGURATION-
SUPPORTED}?
...
```

Example Code 2: PRACH Config Index-Based Configuration Supported

In an embodiment, if the RU 120 supports the 3GPP PRACH config index-based configuration (as indicated by RU o-ran-module-cap.yang presented in FIG. 5, step 505), the DU can use the fields to set the PRACH configuration index to RU. The fields indicate that the DU 110 can select the 3GPP PRACH config index-based configuration in preference to the default O-RAN C-plane PRACH configuration.

6. Auto-IoDT FOR PARAMETER EXCHANGE AND/OR REAL DATA

As previously mentioned, an Auto-IoDT process can be utilized to determine/verify which PRACH configurations are being utilized at the RU 120. In an embodiment, the DU 110 and the RU 120 can be configured to support an IoDT function between the DU 110 and RU 120, wherein the testing of the interoperability between the DU 110 and RU 120 can be performed automatically (hence Auto-IoDT) by the one or more components comprising the DU 110 and/or the RU 120, e.g., the Auto-IoDT does not require human activity to initiate the IoDT process. The Auto-IoDT functionality can perform one or more tests/processes/operations to verify if the respectively connected DU 110 and RU 120 both implement the same PRACH configuration, and whether the implemented PRACH configuration is being performed correctly at both the DU 110 and the RU 120, thereby mitigating any interoperation issues.

Figure 6:
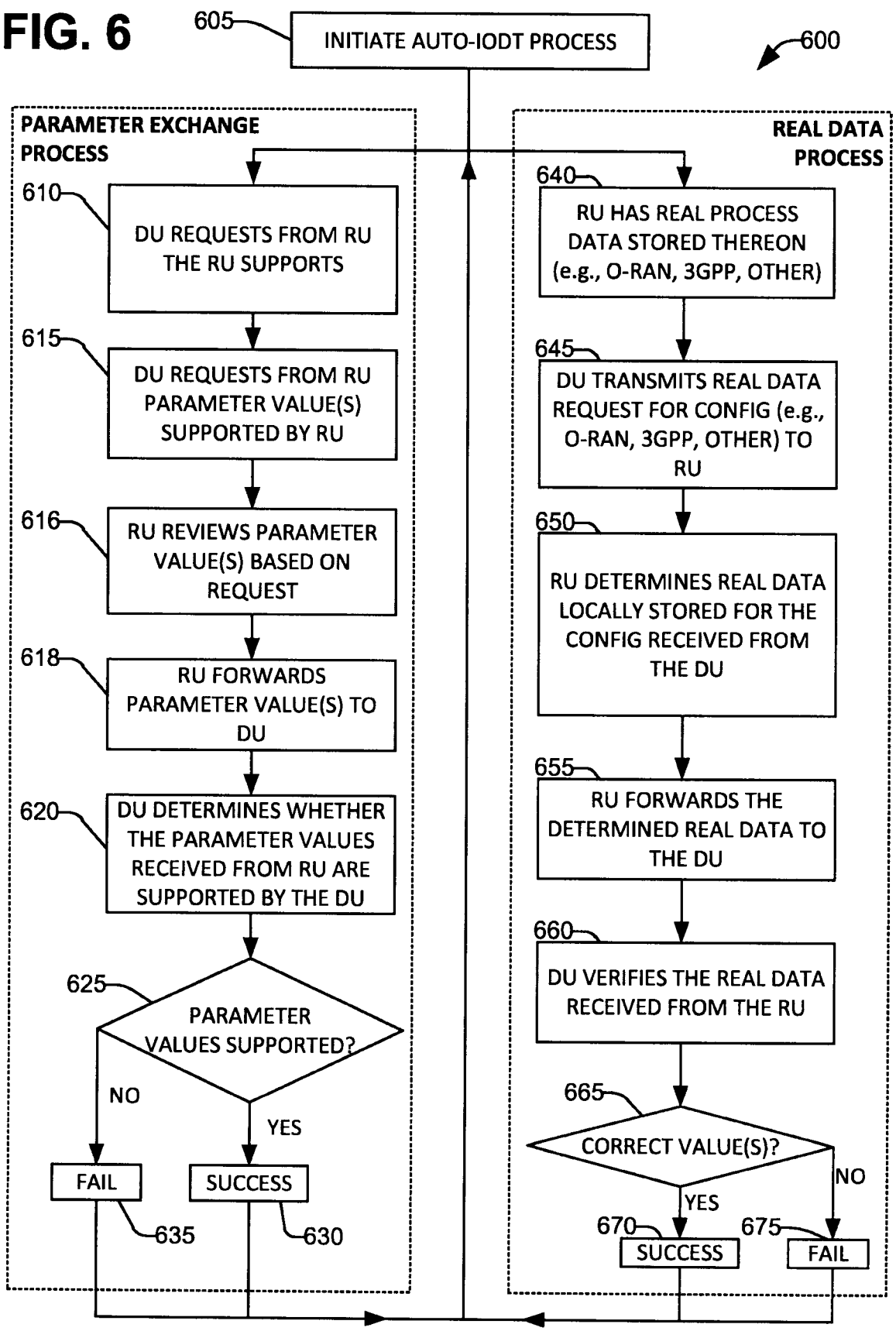
FIG. 6 is a flow diagram of a non-limiting computer implemented method for an Auto-IoDT process between a DU and a RU comprising a parameter exchange process and/or a real data process, in accordance with one or more embodiments described herein.

FIG. 6, illustrates methodology 600 for implementing an Auto-IoDT process between a DU and a RU comprising a parameter exchange process and/or a real data process (in accordance with one or more embodiments described herein. The Auto-IoDT operations can, in an embodiment, utilize a parameter exchange process, whereby the DU 110 and RU 120 exchange the PRACH configuration parameter values they respectively support/have stored thereon (e.g., parameter data 118/128). As further shown in FIG. 6, methodology 600, the Auto-IoDT operations can, in another embodiment, utilize real data, e.g., real data 159/182).

At 605, an Auto-IoDT process can be initiated, where, in an embodiment, the Auto-IoDT operation (e.g., Auto-IoDT 156) can initiate on the DU 110.

At 610, the DU 110 can, in an embodiment, implement an Auto-IoDT process utilizing the parameter exchange process, whereby the DU 110 and the RU 120 can exchange information regarding the configurations they respectively support. In an embodiment, the DU 110 requests from the RU 120, the configurations (e.g., configurations 125A-n, 126A-n, and 127A-n) the RU 120 supports. Configurations previously implemented, or available for implementation, by the DU 110, can be identified (e.g., configurations 115A-n, 116A-n, and 117A-n).

At 615, the DU 110, can request from the RU 120, any parameter values 128 the RU 120 has configured thereon regarding one or more configurations supported/stored at the RU 120.

At 616, the RU 120 can review parameter values 128 stored on RU 120 that were requested by the DU 110, e.g., as stored in LUTs 124A-n as a result of a prior implementation of a configuration, or a configuration available for implementation at the RU 120.

At 618, the RU 120 can forward to the DU 110 any determined parameter values 128, e.g., extracted from LUTs 124A-n.

At 620, based upon the respective configurations and/or parameter values received from the RU 120, the DU 110 can make a determination whether the parameter values 128 defined at the RU 120 (e.g., extracted from LUTs 124A-n) match the parameter values 118 defined/required at the DU 110 (e.g., in LUTs 114A-n). Based upon the parameter values defined at the RU 120, the DU 110 can make a determination on whether to implement the configuration generating the parameters, or not.

At 625, if the parameters 118 and 128 for a pair of configurations (e.g., configuration 126A at the RU 120 and configuration 116A at the DU 110) supported by both the DU 110 and the RU 120 match, the Auto-IoDT process is marked, per 630, as a SUCCESS and the respective pair of common configurations (e.g., 126A and 116A) can be implemented at both the DU 110 and the RU 120.

Alternatively, if, at 625, the parameters are not correctly supported between the DU 110 and the RU 120, the test is marked as a FAIL, and the respective configuration is not operable between DU 110 and RU 120, per 635. In an embodiment, the Auto-IoDT process can be re-initiated at 605, wherein another configuration can be analyzed (per steps 610-635) to determine if that configuration enables interoperability between DU 110 and RU 120 based upon comparable parameter values being identified.

Returning to 605, an Auto-IoDT process can be initiated, where, in an embodiment, the Auto-IoDT function 156 can be initiated on the DU 110 using real data 182 and 159 respectively stored at RU 120 and DU 110, with the operation depicted in FIG. 6, advancing to 640.

At 640, the RU 120 can have stored thereon (e.g., in LUTs 124A-n) real process data 182 (e.g., a PRACH time offset value generated by a prior signal generated by UE 170 to the RU 120) per the PRACH preamble format(s) supported by the RU 120. For example, the real data 182 is generated as a result of a prior implementation of a configuration, or for a configuration available for implementation at the RU 120.

At 645, the DU 110 can, in an embodiment, transmit a request for configuration real data 182 to the RU 120.

At 650, per the request from the DU 110, the RU 120 identifies real data 182 for a configuration (e.g., any of 125A-n, 126A-n, 127A-n) based upon the request from the DU 110 to the RU 120.

At 655, in response to the request from the DU 110, the RU 120 forwards the determined real data 182 to the DU 110.

At 660, based upon the real process data received from the RU 120, the DU 110 can make a determination whether the real process data (e.g., real process data 182) identified and forwarded by the RU 120 match the expected real process data (e.g., real process data 159) supported/required at the DU 110 (e.g., data generated as a result of a prior implementation of a configuration, or for a configuration available for implementation at the DU 110). Based upon whether the real process data obtained from the RU 120 matches the real process data at the DU 110, the DU 110 can make a determination as to whether to implement the supported configurations, or not.

At 665, if the real process data 182 received from the RU 120 matches the real process data 159 stored at the DU 110 for a particular configuration, the Auto-IoDT process is marked, per 670, as a SUCCESS, and the configuration can be utilized.

Alternatively, if, at 665, the real process data 182 does not match real process data 159, the respective configurations are incompatible, the test is marked as a FAIL, per 675. In an embodiment, the Auto-IoDT process can be re-initiated at 605, wherein another configuration can be analyzed (per steps 640-675) to determine if that configuration enables interoperability between DU 110 and RU 120.

It is to be appreciated that either of the methods presented in FIG. 6 (parameter exchange or real data) can be utilized with the Auto-IoDT process(es) 156. The two Auto-IoDT methods, parameter exchange or real data, can also be implemented in a sequential manner. For example, if the Auto-IoDT parameter exchange process is determined to have failed by the DU 110 (e.g., per FIG. 6, 635), it may not be necessary to perform the Auto-IoDT real data process. Furthermore, in an embodiment, the Auto-IoDT real data process can require storage of real time data at the RU 120 (e.g., LUTs 124A-n in memory 123). In an embodiment, the Auto-IoDT real data process may provide more accurate verification of the PRACH time offset than the Auto-IoDT parameter exchange process. Alternatively, the Auto-IoDT parameter exchange process may provide quicker verification of the PRACH time offset than the Auto-IoDT real data process, and may be advantageous in a situation that storage of PRACH data is not available at the RU 120.

As further detailed, any messages, procedures, data model fields, etc., can be added to respective data models at the DU 110 and/or RU 120 to enable utilization of the Auto-IoDT functionality. For example, capability indicators can be added to the RU 120 operating system to indicate if the RU 120 supports the Auto-IoDT parameter exchange process or the Auto-IoDT real data process. For example, capability indicator features can be added to O-RAN functionality on the RU 120, e.g., in the o-ran-module-cap.yang, per Example Code 3: Capability Indicators, below.

```
module o-ran-module-cap {
...
feature PRACH-AUTO-IODT-PARA-EXCHANGE-SUPPORTED { description "This
leaf is used to indicate O-RU's support for PRACH Auto-IoDT - Parameter
Exchange function.";
    }
feature PRACH-AUTO-IODT-REAL-DATA-SUPPORTED { description "This leaf is
used to indicate O-RU's support for PRACH Auto-IoDT - Real Data function.";
    }
    ...
    }
```

Example Code 3: Capability Indicators

In an embodiment, the two features presented in Example Code 3 can be optionally added in the O-RAN FH m-plane. Accordingly, the RU 120 can report the feature(s) it supports based upon the capabilities of the RU 120. If the RU 120 does not support a particular method, e.g., does not support an Auto-IoDT parameter exchange process or an Auto-IoDT real data process, it does not indicate to the DU 110 support for that particular method.

6.1. Auto-IoDT Utilizing Parameter Exchange

Figure 7:
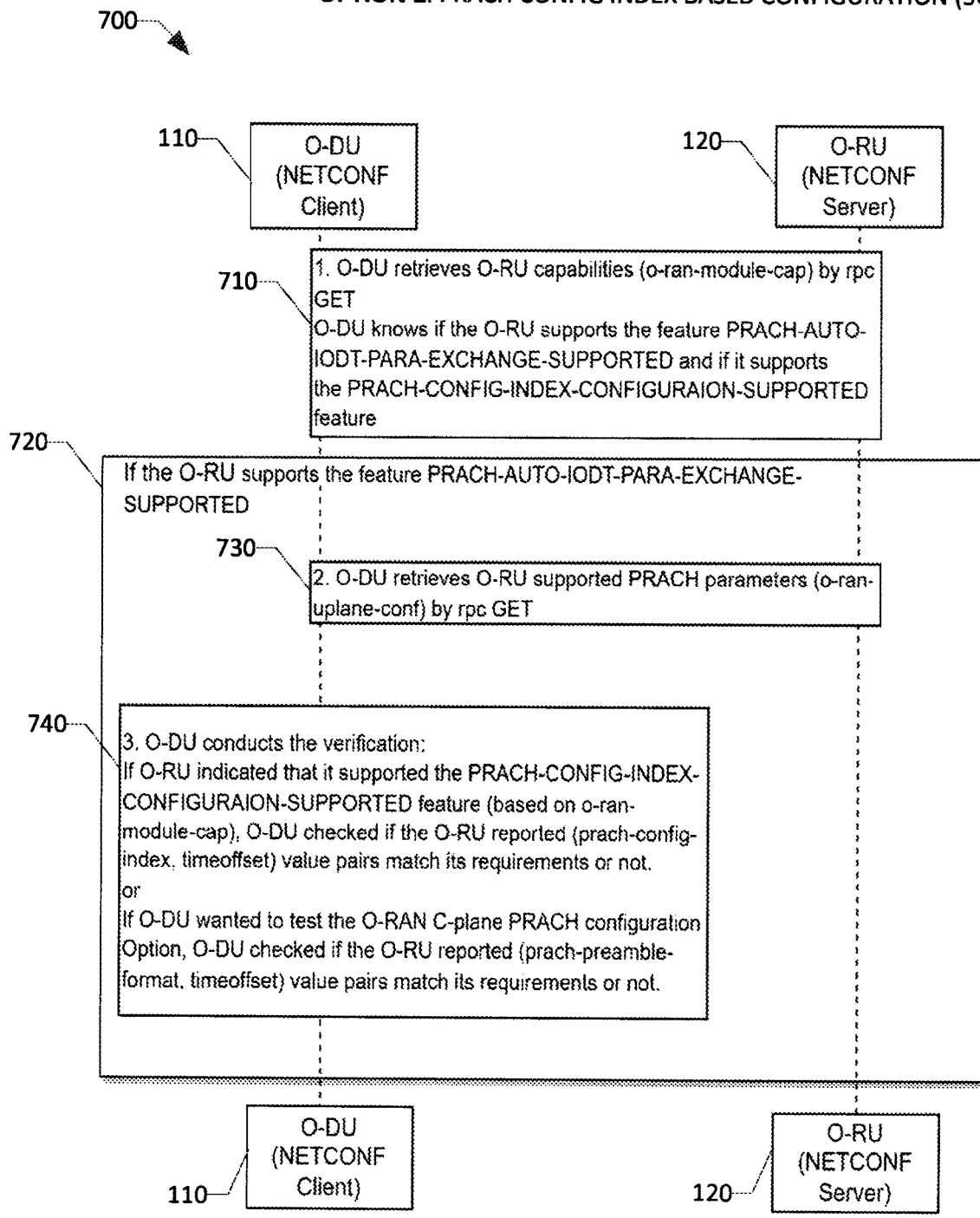
FIG. 7 is a flow diagram of a non-limiting computer implemented method for an Auto-IoDT process utilizing parameter exchange between a DU and a RU, in accordance with one or more embodiments described herein.

FIG. 7 presents a flow diagram 700 illustrating the Auto-IoDT process utilizing parameter exchange functionality. In an embodiment, as shown below, data model fields are introduced to support this functionality.

At 710, the DU 110 obtains the capabilities of the RU 120 (e.g., of o-ran-module-cap) by a remote procedure call (rpc) GET function. Based upon the capabilities received from the RU 120, the DU 110 can determine whether the RU 120 supports the PRACH-AUTO-IODT-PARA-EXCHANGE-SUPPORTED feature, and further, whether the RU 120 supports the PRACH-CONFIG-INDEX-CONFIGURATION-SUPPORTED feature.

At 720, the operations continue based upon the RU 120 supports the PRACH-AUTO-IODT-PARA-EXCHANGE-SUPPORTED.

To support Auto-IoDT parameter exchange functionality with the O-RAN C-plane PRACH configuration, the code presented in Example Code 4 is to be added to the o-ran-uplane-conf.yang module at the RU 120.

```
module: o-ran-uplane-conf
+--rw user-plane-configuration
...
+--ro prach-preamble-format-timeoffset* [prach-preamble-format-timeoffset-id]
{mcap: PRACH-AUTO-IODT-PARA-EXCHANGE-SUPPORTED}?
   | +--ro prach-preamble-format-timeoffset-id uint8
   | +--ro supported-prach-preamble-format prach-preamble-format
   | +--ro supported-timeoffset uint16
...
```

Example Code 4: Auto-IoDT Code for O-Ran C-Plane PRACH Configuration

Per Example Code 4, if the RU 120 supports the feature PRACH-AUTO-IODT-PARA-EXCHANGE-SUPPORTED, it will provide the DU 110 with a list of (prach-preamble-format, timeoffset) pairs it supports. For example, the RU 120 may report it supports the (prach-preamble-format, timeoffset) pairs as (NR-B4, 484), (NR-B4, 2676). Accordingly, upon receipt of the pairs from the RU 120, the DU 110 checks if the values reported by the RU 120 match the requirements and/or implementations of the DU 110, or not. In the event of the values reported by the RU 120 matching the requirements and/or implementations of the DU 110, the Auto-IoDT parameter exchange process is determined to be a success. In the event of the values reported by the RU 120 do not match the requirements and/or implementations of the DU 110, the Auto-IoDT parameter exchange process is determined by the DU 110 to have failed.

To support Auto-IoDT parameter exchange functionality with the PRACH Config Index-based configuration (e.g., per 3GPP), the code presented in Example Code 5 is to be added to the o-ran-uplane-conf.yang module at the RU 120.

```
module: o-ran-uplane-conf
+--rw user-plane-configuration
...
   +--ro prach-config-index-timeoffset* [prach-config-index-timeoffset-id] {mcap:
PRACH-CONFIG-INDEX-CONFIGURATION-SUPPORTED and mcap: PRACH-AUTO-
IODT-PARA-EXCHANGE-SUPPORTED}?
   | +--ro prach-config-index-timeoffset-id uint8
   | +--ro supported-prach-config-index uint16
   | +--ro supported-timeoffset uint16
...
```

At 730, the DU 110 receives from the RU 120 the supported PRACH parameters 128 (o-ran-uplane-conf) based upon a rpc GET.

At 740, the DU 110 performs the following verification:
 a) if the RU 120 indicated that the RU 120 supported the PRACH-CONFIG-INDEX-CONFIGURATION-SUPPORTED feature (e.g., based on the o-ran-module-cap), the DU 110 checks to confirm if the value pairs (e.g., prach-config-index, timeoffset) received from the RU 120 match those required/expected by the DU 110, or not; or
 b) if the DU 110 is configured to test the O-RAN C-plane PRACH configuration option at the RU 120, the DU 110 checks to confirm if the value pairs (e.g., prach-preamble format, timeoffset) received from the RU 120 match those required/expected by the DU 110, or not.

Example Code 5: Auto-IoDT Code for PRACH Config Index-Based Configuration (e.g., Per 3GPP)

Per Example Code 5, if the RU 120 supports the features PRACH-CONFIG-INDEX-CONFIGURATION-SUPPORTED and PRACH-AUTO-IODT-PARA-EXCHANGE-SUPPORTED, the RU 120 reports to the DU 110 a list of (prach-config-index, timeoffset) parameter pairs 128 it supports. For example, the RU 120 may report it supports the (prach-config-index, timeoffset) parameter pairs 128 as (150, 2676), (154, 484), (156, 484). Accordingly, upon receipt of the pairs from the RU 120, the DU 110 checks if the values reported by the RU 120 match the parameter pairs 118 required by DU 110, or not. In the event of the parameter values 128 reported by the RU 120 matching the parameter pairs 118 of the DU 110, the Auto-IoDT parameter exchange process is determined to be a success and respective configurations at the RU 120 and DU 110 can be implemented. In the event of the parameter pairs 128 reported by the RU 120 do not match the parameter pairs 118 anticipated by the DU 110, the Auto-IoDT parameter exchange process 156 is determined by the DU 110 to have failed.

6.2 Auto-IoDT Utilizing Real Data

Figure 8:
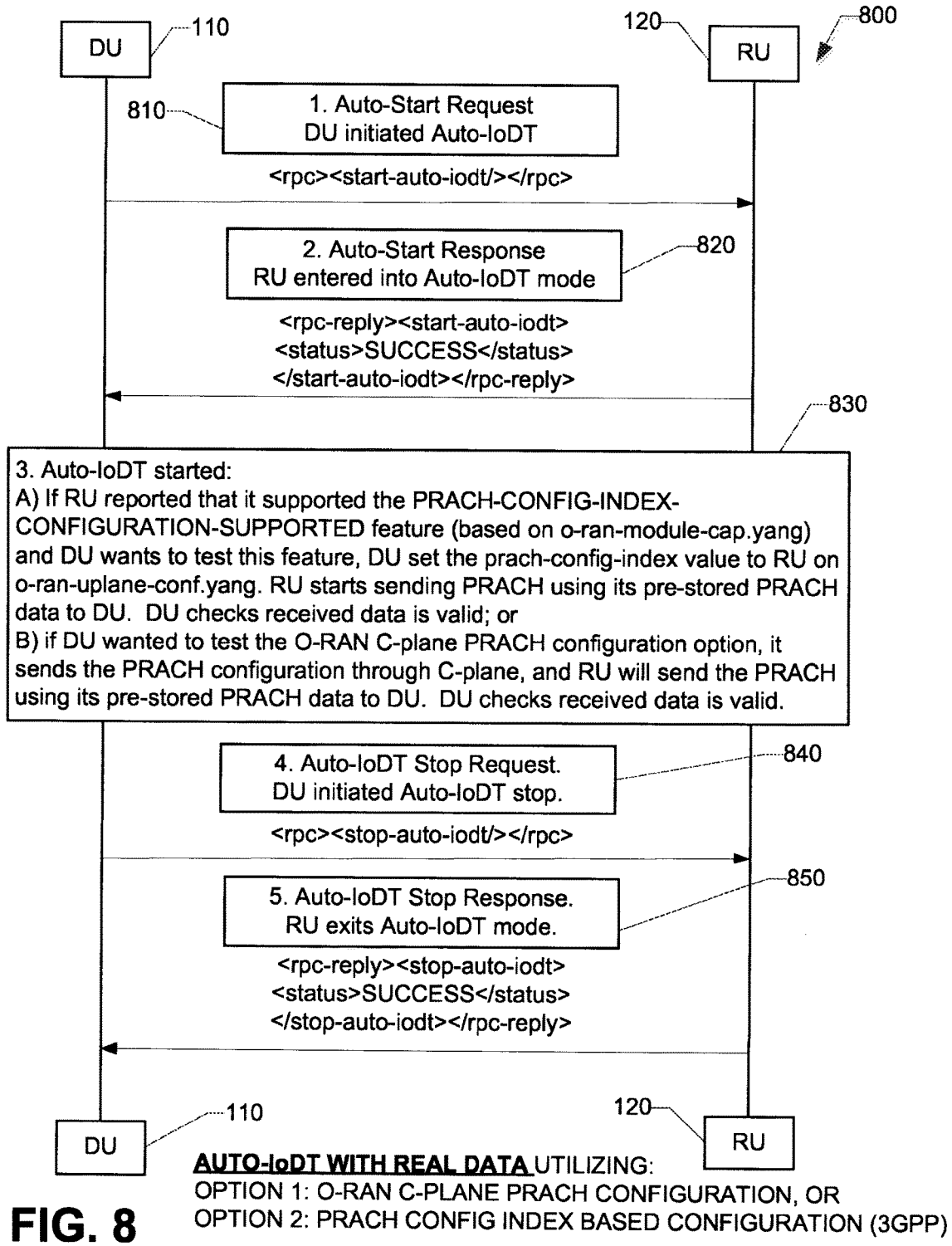
FIG. 8 is a flow diagram of a non-limiting computer implemented method for an Auto-IoDT process utilizing real data between a DU and a RU, in accordance with one or more embodiments described herein.

FIG. 8 presents a flow diagram 800 illustrating the Auto-IoDT process utilizing real data. In an embodiment, as shown below, data model fields are introduced to support this functionality. In an embodiment, as shown in Example Code 6, data model fields are introduced in the o-ran-Auto-IoDT module.

```
module: o-ran-Auto-IoDT
rpcs:
    +---x start-Auto-IoDT
    +--ro output
       +-- ro status?              enumeration
       +-- ro error-messages?      string
    +---x stop-Auto-IoDT
    +--ro output
       +-- ro status?              enumeration
       +-- ro error-messages?      string
```

Example Code 6. Auto-IoDT Code Supporting Real Data Exchange

At 810, the Auto-IoDT 156 at the DU 110 initiates an Auto-IoDT start request, e.g., comprising <rpc><start-Auto-IoDT/></rpc>.

At 820, in response to the Auto-IoDT request generated by the DU 110, an Auto-IoDT process is initiated at the RU 120, e.g.,
<rpc-reply><start-Auto-IoDT>
<status>SUCCESS</status>
</start-Auto-IoDT></rpc-reply>

At 830, the Auto-IoDT begins, where:
a) if the RU 120 responded to the DU 110 that the RU 120 supported the PRACH-CONFIG-INDEX-CONFIGURATION-SUPPORTED feature (e.g., based on o-ran-module-cap.yang), the DU 110 can make a determination of whether information sent from the RU 120 is valid. In an embodiment, the DU 110 sends a prach-config-index-value to the RU 120 utilizing the o-ran-uplane-conf.yang. The RU 120 determines a value in the pre-stored PRACH data 182 at the RU 120 (e.g., in memory 123), and forwards the data value 182 to the DU 110. The DU 110 can then validate whether the PRACH data value 182 received from the RU 120 matches the real process data 159 values required/expected by the DU 110, or not; or
b) if the DU 110 is configured to test the O-RAN C-plane PRACH configuration implemented at the RU 120, the DU 110 can send a PRACH configuration through the C-plane to the RU 120. The RU 120 can determine a value in the pre-stored PRACH data 182 at the RU 120 and forward that process data value 182 to the DU 110. The DU 110 can then validate whether the PRACH data 182 received from the RU 120 matches the process data values 159 required/expected by the DU 110, or not.

At 840, the DU 110 can initiate an Auto-IoDT Stop Request and transmit it to the RU 120, e.g., <rpc><stop-Auto-IoDT/></rpc>

At 850, in response to receiving the Auto-IoDT Stop Request from the DU 110, the RU 120 can exit the Auto-IoDT Stop Request and send an indication to the DU 110 that the RU 120 has exited the Auto-IoDT operation, e.g.,
<rpc-reply><stop-Auto-IoDT>
<status>SUCCESS</status>
</stop-Auto-IoDT></rpc-reply>

7. AUTO-CONFIG-SELECTION

Figure 9:
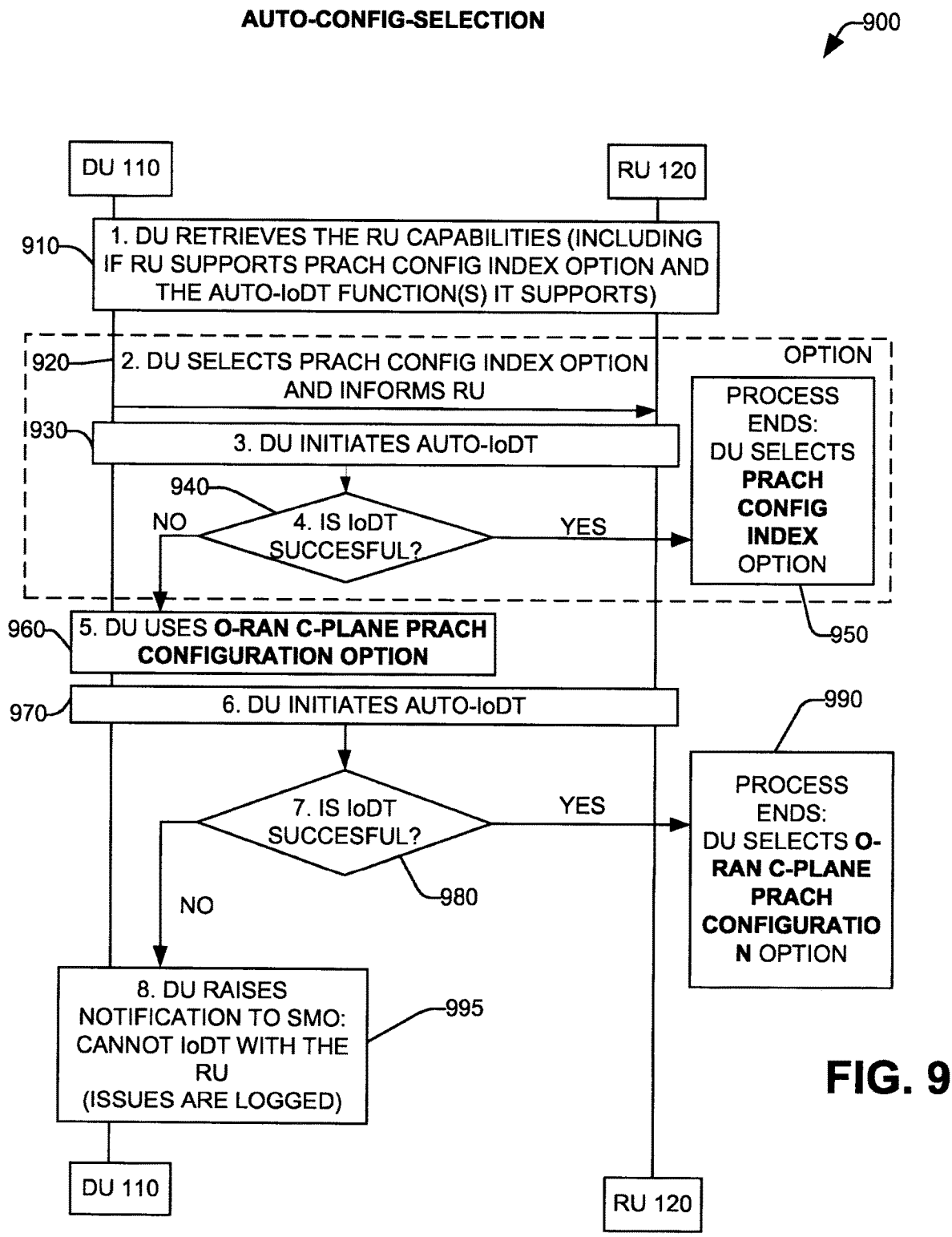
FIG. 9 is a flow diagram of a non-limiting computer implemented method for selecting a configuration to be utilized by a DU and a RU, in accordance with one or more embodiments described herein.

FIG. 9, method 900, presents an example embodiment of an Auto-config-selection operation. As previously mentioned, an Auto-config-selection operation can be utilized to configure and verify a PRACH time offset configuration to be utilized by the DU 110 and the RU 120.

At 910, the DU 110 obtains from the RU 120 the capabilities supported by the RU 120, including if the RU 120 supports the 3GPP PRACH Config index option configuration and the Auto-IoDT functionality the RU 120 supports. At 910, the required data model fields are defined, per Example codes 1, 2, 4, and 5. Standard O-RAN M-plane rcp GET procedure is used.

At 920, in response to the functionality information received from the RU 120, the DU 110 selects (e.g., by the Auto-Config-Select component 158) the PRACH Config index option configuration. The DU 110 informs the RU 120 that the PRACH Config index option configuration has been selected by the DU 110. The required data model fields are defined in Example codes 1 and 2. Standard O-RAN M-plane rpc EDIT procedure is used.

At 930, the DU 110 initiates Auto-IoDT (e.g., Auto-IoDT 156). The Auto-IoT functions, processes, and required data model are defined per Example Codes 3, 4, 5, 6, and FIGS. 7 and 8.

At 940, the DU determines whether the Auto-IoDT operation is successful. DU 110 checks if Auto-IoDT is SUCCESS or FAIL.

At 950, in the event of the Auto-IoDT being successful, the DU 110 selects the PRACH config index option configuration (e.g., 126A and 116A), and the Auto-config-selection operation ends.

At 960, in the event of the Auto-IoDT operation being unsuccessful, the DU 110 is configured to determine whether the O-RAN C-plane configuration option can be utilized. To use the O-RAN C-plane PRACH configuration Option, the DU 110 can be configured to remove the fields prach-config-indexes and low-level-rx-endpoints.prach-config-index at the RU 120 o-ran-uplane-conf. Standard O-RAN M-plane rpc EDIT procedure can be utilized.

At 970, the DU 110 initiates Auto-IoDT. The Auto-IoT functions' processes and required data model are defined per Example Codes 3, 4, 5, 6, and FIGS. 7 and 8.

At 980, the DU determines whether the Auto-IoDT operation is successful. DU 110 checks if IoDT is SUCCESS or FAIL.

At 990, in the event of the Auto-IoDT being successful, the DU 110 selects the O-RAN C-plane configuration (e.g., configurations 125A and 115A) option to be utilized, and the Auto-config-selection operation ends.

At 995, in the event of the Auto-IoDT operation being unsuccessful, the DU 110 is configured to determine that the DU 110 is unable to communicate with the RU 120 regarding PRACH time offset and/or failure of the Auto-IoDT process, the DU 110 can notify the SMO and can further record what issues have caused the Auto-IoDT process between the DU 110 and the RU 120 to fail.

As indicated in FIG. 9, an option exists for the DU 110 to enact steps 920, 930, 940, and 950 only in the event of the RU 120 reporting to the DU 110 that the RU 120 supports the PRACH Config Index Option (e.g., with the feature PRACH-CONFIG-INDEX-CONFIGURATION-SUP-PORTED in o-ran-module-cap.yang). If the RU 120 does not report supporting the PRACH Config Index Option, the DU 110 can be configured to advance to step 960.

8. SYSTEM EXTENSIBILITY

Figure 10A:
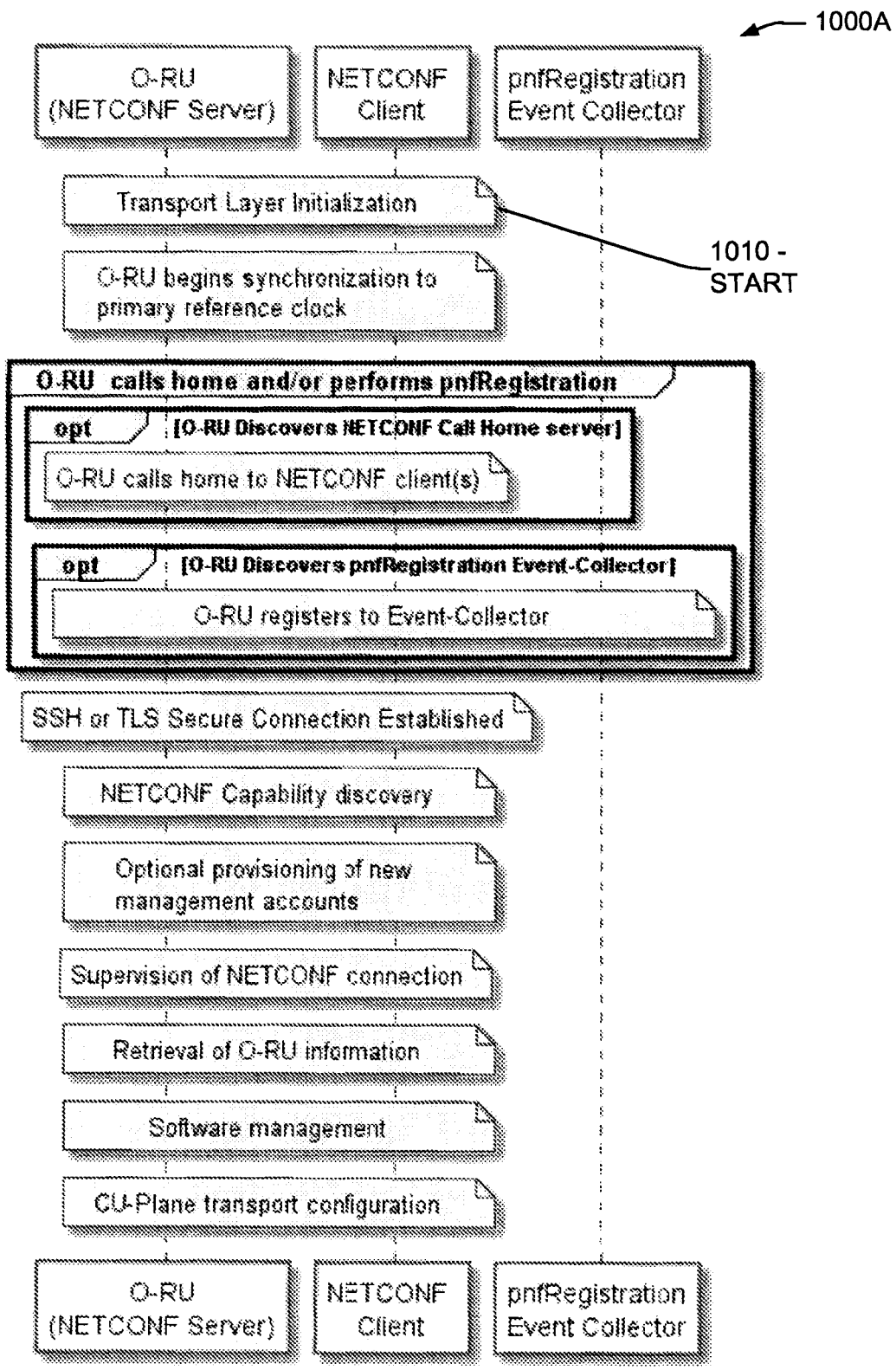
FIGS. 10A and 10B present an Overall of Start-Up Installation extracted from an O-RAN defined start-up process, illustrating implementation of one or more embodiments presented herein.
Figure 10B:
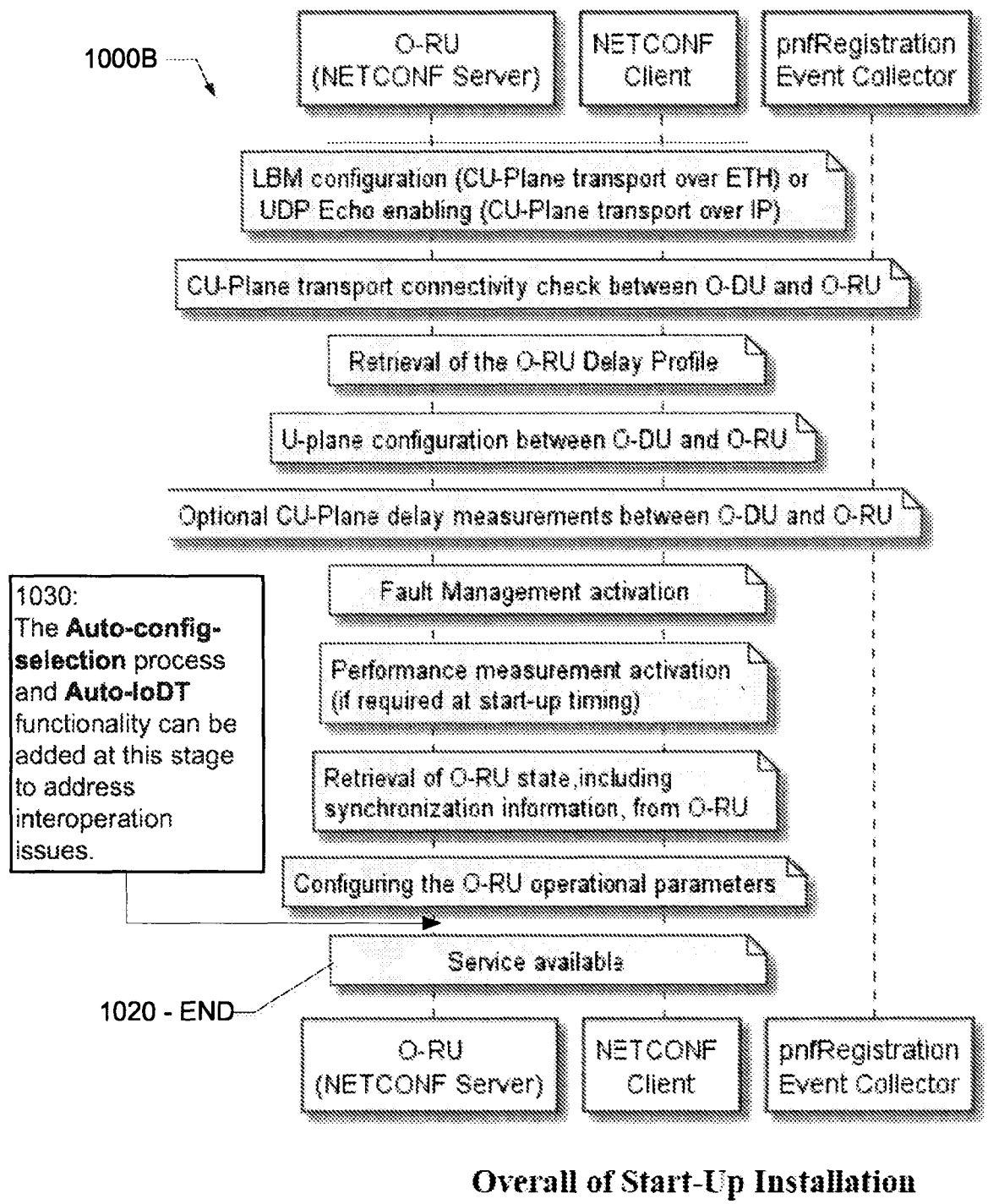

FIGS. 10A and 10B present an Overall of Start-Up Installation from an O-RAN defined start-up process. To enable readability of the respective steps comprising the start-up process, the start-up process is presented with FIG. 10A illustrating the initial steps of the O-RAN start-up process and FIG. 10B illustrating the subsequent steps, wherein the start-up process progresses from 1010-START to 1020-END. The various embodiments presented herein can be extended to incorporate the addition of new capabilities or functionality of the O-RAN and its components. For example, the Auto-config-selection process (e.g., Auto-config-select component 158) to select one of the configuration options and the Auto-IoDT functions (e.g., Auto-IoDT function 156) can be utilized during the RU 120 start-up process, as shown at 1030, as part of the configuration of the operational parameters at the RU 120. If the test is SUCCESS, the SMO and/or the DU 110 can record the option successfully tested and selected for the respective DU 110 and RU 120 pair (with their models and software versions). In an embodiment, the Auto-config-selection and the Auto-IoDT functions do not have to be executed again during a subsequent RU 120 start-up process if, in the interim, there is no change on the DU 110 and/or RU 120 operational software for the same DU 110 and RU 120 pairing.

The Auto-config-selection process and Auto-IoDT function can be extended to other scenarios besides the RU 120 start-up. Example situations include:
1. if the DU 110 changes the PRACH configuration (e.g., using a new PRACH Configuration Index); or
2. if the DU 110 and/or the RU 120 undergo operational software changes, updates. etc.

The Auto-IoDT functions (e.g., FIGS. 6-8) can also be utilized for verification of other 3GPP Physical Channel configurations, e.g., PRACH frequency offset, PRACH fast fourier transform (FFT) size, sounding reference signal (SRS) time position, SRS frequency position, synchronization and signal block (SSB) time position, SSB frequency position, etc.

For PRACH frequency offset and PRACH FFT size, to enable the Auto-IoDT: Parameter Exchange method (ref. FIG. 6, steps 605-635 and FIG. 7), new RU data model fields can be introduced for 1) RU reports supported PRACH frequency offset and FFT size values, and 2) DU to validate if the RU's capabilities match its requirements and implementations.

To enable the Auto-IoDT: Real Data method (ref. FIG. 6, steps 605 and 640-675, and FIG. 8), the same pre-stored PRACH data in the RU's memory can be used. The additional RPCs and processes presented in Example Code 6 and FIG. 8 can be leveraged to add support for the PRACH frequency offset and PRACH FFT size validations.

9. SYSTEM BACKWARD COMPATIBILITY

The various embodiments presented herein are backward compatible with existing capabilities and functionality of a RAN 105 and its components. The various embodiments presented herein include various configurations, functions, processes, data models, and data model fields, for the DU 110 and the RU 120, wherein the various configurations, etc., can be added to existing O-RAN FH specifications as optional configurations and functionality. The various configurations, etc., are enabled such that the DU 110 and the RU 120 can still support mandatory functionality as defined in the existing O-RAN FH specifications.

The various embodiments presented herein add optional capability indicators for the RU120 in the O-RAN O-RU Data Model:
(a) if the RU 120 reports to DU 110 that it supports the PRACH config index-based configuration (e.g., configurations 116A-n and 126A-n) and the Auto-IoDT functions:
(i) and the DU 110 also supports the PRACH config index-based configuration and the Auto-IoDT functions, the DU 110 can utilize the Auto-config-selection component 158 and Auto-IoDT component 156 as presented in one or more embodiments described herein.
(ii) if the DU 110 does not support the PRACH config index-based configuration and/or the Auto-IoDT functions, the DU 110 will not implement the various embodiments presented herein. Accordingly, the existing O-RAN defined functions can be utilized by default and there is no change on the existing processes.
(b) if the RU 120 does not support any of the functions presented in the various embodiments herein, the DU 110 can obtain this information based on the capabilities of the RU 120 reported and will not conduct the function accordingly.

In view of the foregoing, it is apparent that the various embodiments, the application or failure of application render the various embodiments to be backward compatible with existing specifications/procedures.

The various embodiments presented herein, e.g., regarding data models, data model fields, messages, and message exchange processes use the same format as that utilized in the O-RAN FH M-plane specification(s).

10. EXAMPLE APPLICATIONS AND USE

Figure 11:
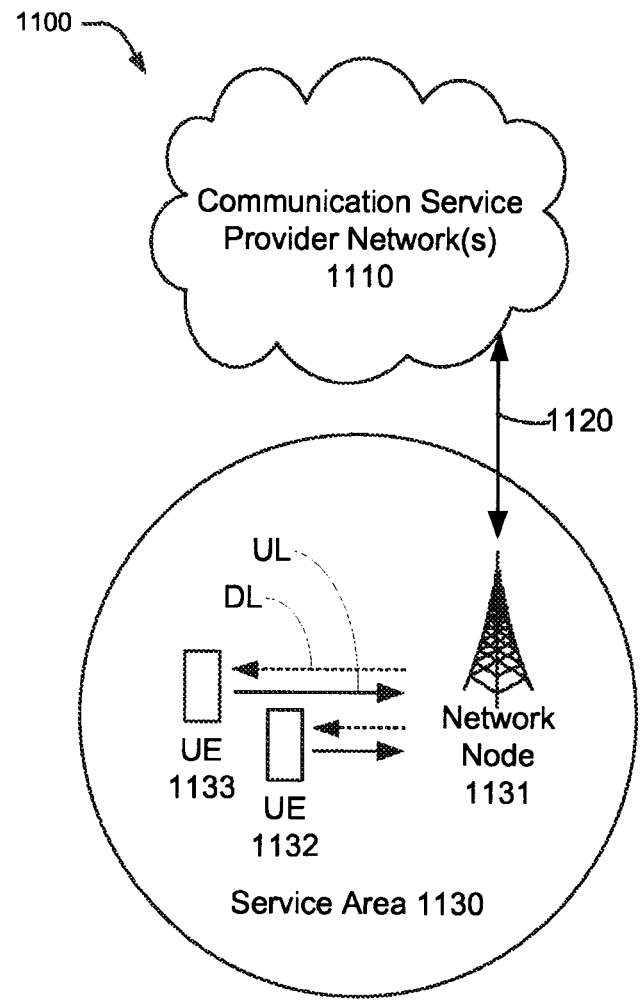
FIG. 11 illustrates an example wireless communication system, in accordance with one or more embodiments described herein.

FIG. 11 illustrates an example wireless communication system 1100, in accordance with one or more embodiments described herein. The example wireless communication system 1100 comprises communication service provider network(s) 1110, a network node 1131, and user equipment (UEs) 1132, 1133. A backhaul link 1120 connects the communication service provider network(s) 1110 and the network node 1131. The network node 1131 can communicate with UEs 1132, 1133 within its service area 1130. The dashed arrow lines from the network node 1131 to the UEs 1132, 1133 represent downlink (DL) communications to the UEs 1132, 1133. The solid arrow lines from the UEs 1132, 1133 to the network node 1131 represent uplink (UL) communications.

In general, with reference to FIG. 11, the non-limiting term "user equipment" can refer to any type of device that can communicate with network node 1131 in a cellular or mobile communication system 1100. UEs 1132, 1133 can have one or more antenna panels having vertical and horizontal elements. Examples of UEs 1132, 1133 comprise target devices, device to device (D2D) UEs, machine type UEs or UEs capable of machine to machine (M2M) communications, personal digital assistants (PDAs), tablets, mobile terminals, smart phones, laptop mounted equipment (LME), universal serial bus (USB) dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, augmented reality head mounted displays, and the like. UEs 1132, 1133 can also comprise IOT devices that communicate wirelessly.

In various embodiments, system 1100 comprises communication service provider network(s) 1110 serviced by one or more wireless communication network providers. Communication service provider network(s) 1110 can comprise a "core network". In example embodiments, UEs 1132, 1133 can be communicatively coupled to the communication service provider network(s) 1110 via a network node 1131. The network node 1131 can communicate with UEs 1132, 1133, thus providing connectivity between the UEs 1132, 1133 and the wider cellular network. The UEs 1132, 1133 can send transmission type recommendation data to the network node 1131. The transmission type recommendation data can comprise a recommendation to transmit data via a closed loop multiple input multiple output (MIMO) mode and/or a rank-1 precoder mode.

Network node 1131 can have a cabinet and other protected enclosures, computing devices, an antenna mast, and multiple antennas for performing various transmission operations (e.g., MIMO operations) and for directing/steering signal beams. Network node 1131 can comprise one or more base station devices which implement features of the network node. Network nodes can serve several cells, depending on the configuration and type of antenna. In example embodiments, UEs 1132, 1133 can send and/or receive communication data via wireless links to the network node 1131.

Communication service provider networks 1110 can facilitate providing wireless communication services to UEs 1132, 1133 via the network node 1131 and/or various additional network devices (not shown) included in the one or more communication service provider networks 1110. The one or more communication service provider networks 1110 can comprise various types of disparate networks, including but not limited to: cellular networks, femto networks, picocell networks, microcell networks, internet protocol (IP) networks Wi-Fi service networks, broadband service network, enterprise networks, cloud-based networks, millimeter wave networks and the like. For example, in at least one implementation, system 1100 can be or comprise a large-scale wireless communication network that spans various geographic areas. According to this implementation, the one or more communication service provider networks 1110 can be or comprise the wireless communication network and/or various additional devices and components of the wireless communication network (e.g., additional network devices and cell, additional UEs, network server devices, etc.).

The network node 1131 can be connected to the one or more communication service provider networks 1110 via one or more backhaul links 1120. The one or more backhaul links 1120 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 1120 can also comprise wireless link components, such as but not limited to, line-of-sight (LOS) or non-LOS links which can comprise terrestrial air-interfaces or deep space links (e.g., satellite communication links for navigation). Backhaul links 1120 can be implemented via a "transport network" in some embodiments. In another embodiment, network node 1131 can be part of an integrated access and backhaul network. This may allow easier deployment of a dense network of self-backhauled 5G cells in a more integrated manner by building upon many of the control and data channels/procedures defined for providing access to UEs 1132, 1133.

Wireless communication system 1100 can employ various cellular systems, technologies, and modulation modes to facilitate wireless radio communications between devices (e.g., the UEs 1132, 1133 and the network node 1131). While example embodiments might be described for 5G new radio (NR) systems, the embodiments can be applicable to any radio access technology (RAT) or multi-RAT system where the UE operates using multiple carriers, e.g., LTE FDD/TDD, GSM/GERAN, CDMA2000 etc.

For example, system 1100 can operate in accordance with any 5G, next generation communication technology, or existing communication technologies, various examples of which are listed supra. In this regard, various features and functionalities of system 1100 are applicable where the devices (e.g., the UEs 1132, 1133 and the network node 1131) of system 1100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 1100 can be configured to provide and employ 5G or subsequent generation wireless networking features and functionalities. 5G wireless communication networks are expected to fulfill the demand of exponentially increasing data traffic and to allow people and machines to enjoy gigabit data rates with virtually zero (e.g., single digit millisecond) latency. Compared to 4G, 5G supports more diverse traffic scenarios. For example, in addition to the various types of data communication between conventional UEs (e.g., phones, smartphones, tablets, PCs, televisions, internet enabled televisions, AR/VR head mounted displays (HMDs), etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example, several hundreds of thousands of simultaneous connections to be supported for massive sensor deployments; improved coverage, enhanced signaling efficiency; reduced latency compared to LTE.

The 5G access network can utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 9 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the 3GPP and has been in use (including with LTE), is a multi-antenna technique that can improve the spectral efficiency of transmissions, thereby significantly boosting the overall data carrying capacity of wireless systems. The use of MIMO techniques can improve mmWave communications and has been widely recognized as a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are in use in 5G systems.

Figure 12:
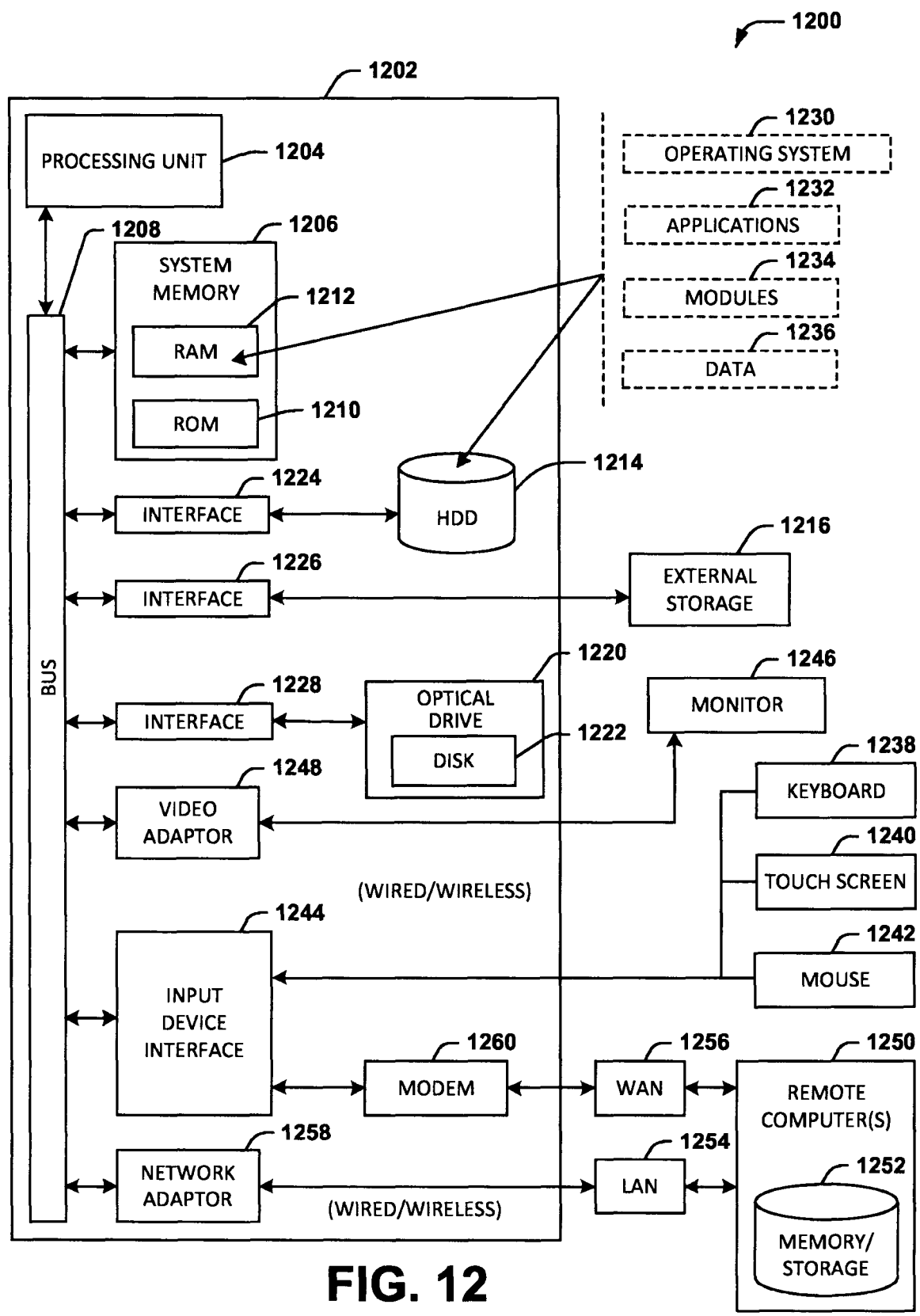
FIG. 12 illustrates a block diagram of an example computer operable to execute one or more embodiments presented herein.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors and may include a cache memory. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid-state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can comprise a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities. The terms "set" and "group" are used interchangeably herein.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," "BS transceiver," "BS device," "cell site," "cell site device," "gNode B (gNB)," "evolved Node B (eNode B, eNB)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

It should be noted that although various aspects and embodiments are described herein in the context of 5G, O-RAN, or other generation networks, the disclosed aspects are not limited to 5G or O-RAN implementations, and can be applied in other network next generation implementations, such as sixth generation (6G), or other wireless systems. In this regard, aspects or features of the disclosed embodiments can be exploited in substantially any wireless communication technology. Such wireless communication technologies can include universal mobile telecommunications system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), 5G, third generation partnership project 2 (3GPP2), ultra-mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
 facilitating, by a first device comprising a processor, receiving a first signal comprising indication data representative of an indication of physical random access channel (PRACH) configurations available for implementation by a second device communicatively coupled to the first device via a radio access network (RAN);

based on the indication, selecting, by the first device, a PRACH configuration of the PRACH configurations to be utilized at the second device for an operation using a PRACH;

generating, by the first device, first test data representative of an interoperability test performed on the PRACH configuration at the first device;

transmitting, by the first device, an instruction to the second device to transmit second test data, wherein the second test data is generated from performing the interoperability test with the PRACH configuration implemented at the second device;

receiving, from the second device, the second test data representative of performing the interoperability test on the PRACH configuration at the second device;

comparing, at the first device, the first test data with second test data; and facilitating, by the first device in response to determining that the first data matches the second data, transmitting, to the second device, a third signal comprising instruction data representative of an instruction to the second device to implement the PRACH configuration to communicate with the first device.

2. The method according to claim 1, wherein the PRACH configurations relate to a PRACH time offset utilized by a third device communicatively coupled to the second device.

3. The method according to claim 1, wherein the first device is a distributed unit that is part of the RAN and the second device is a radio unit that is part of the RAN.

4. The method according to claim 1, wherein the PRACH configurations comprise a control-plane PRACH configuration.

5. The method according to claim 1, wherein the PRACH configurations comprise an index-based PRACH configuration.

6. A system, comprising:
at least one processor; and
a memory coupled to the at least one processor and having instructions stored thereon, wherein, in response to the at least one processor, the instructions facilitate performance of operations, comprising:
receiving first data from a first device, wherein the first data pertains to a first physical random access channel (PRACH) configuration of a group of PRACH configurations available to be implemented on the first device;
comparing the first data with second data, wherein the second data is stored locally and relates to the first PRACH configuration; and
in response to determining that the first data and the second data do not match:
  instructing the first device to send third data, wherein the third data corresponds to a second PRACH configuration of the group of PRACH configurations stored at the first device;
  comparing the third data with fourth data, wherein the fourth data is stored locally and relates to the second PRACH configuration; and
  in response to determining that the third data and the fourth data match, instructing the first device to implement the second PRACH configuration.

7. The system of claim 6, wherein the first PRACH configuration comprises an offset parameter representative of a PRACH timing offset value utilized by a second device communicatively coupled to the first device.

8. The system of claim 6, wherein the first device is a radio unit located on a radio access network (RAN) and the system is a distributed unit located on the RAN.

9. The system of claim 6, wherein the first data was generated during a previous implementation of the first PRACH configuration on the first device, and the second data was generated during a previous implementation of the first PRACH configuration on the system.

10. The system of claim 6, wherein the first data comprises a parameter setting for the first PRACH configuration obtained from configuration data stored at the first device for the first PRACH configuration and the second data comprises the parameter setting for the first PRACH configuration stored at the system.

11. The system of claim 6, wherein the first PRACH configuration is a control-plane PRACH configuration.

12. The system of claim 6, wherein the first PRACH configuration is an index-based PRACH configuration.

13. A computer program product stored on a non-transitory computer-readable medium and comprising machine-executable instructions, wherein, in response to being executed, the machine-executable instructions cause a machine to perform operations, comprising:
receiving first data from a first device communicatively coupled to the machine operating on a second device via a radio access network (RAN), wherein the first data describes a first configuration in a set of configurations available at the first device to facilitate communications between the first device, the second device, and a third device communicatively coupled to the first device;
comparing the first data with second data stored at the second device, wherein the second data describes implementation of a version of the first configuration at the second device; and
responsive to the first data and the second data being determined not to match:
  instructing the first device to send third data, wherein the third data describes a second configuration in the set of configurations available at the first device to facilitate communications between the first device, the second device, and the third device,
  comparing the third data with fourth data stored at the second device, wherein the fourth data describes implementation of a version of the second configuration at the second device, and
  responsive to the third data and the fourth data being determined to match, instructing the first device to implement the second configuration.

14. The computer program product according to claim 13, wherein the set of configurations is a set of physical random access channel (PRACH) configurations.

15. The computer program product according to claim 13, wherein each configuration in the set of PRACH configurations is a control-plane PRACH configuration or an index-based PRACH configuration.

16. The computer program product according to claim 13, wherein the set of configurations describes a physical random access channel (PRACH) timing offset utilized for the communication between the third device, the first device, and the second device.

17. The computer program product according to claim 13, wherein the first device is a radio unit of the RAN and the second device is a distributed unit of the RAN.

18. The computer program product according to claim 13, wherein the first configuration is a first physical random access channel (PRACH) configuration and the first data comprises a first parameter setting for the first PRACH configuration obtained from configuration data stored at the first device for the first PRACH configuration and the second data comprises a second parameter setting for the version of the first PRACH configuration stored at the second device.

19. The computer program product according to claim 13, wherein the first configuration is a first physical random access channel (PRACH) configuration included in the set of configurations, and the first data was generated during a previous implementation of the first PRACH configuration on the first device, and the second data was generated during a previous implementation of the first PRACH configuration on the second device.

20. The computer program product according to claim 13, wherein the third device is one of a user equipment, a wearable communication device, an extended reality device, an Internet of Things device, a remote computing system, or an automated assistant device.

\* \* \* \* \*